(12) United States Patent
Chapman

(10) Patent No.: US 7,037,006 B2
(45) Date of Patent: *May 2, 2006

(54) CAMERA CRANE

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 10/668,120

(22) Filed: Sep. 23, 2003

(65) Prior Publication Data

US 2004/0057718 A1 Mar. 25, 2004

Related U.S. Application Data

(63) Continuation-in-part of application No. 10/462,565, filed on Jun. 16, 2003, now abandoned, which is a continuation-in-part of application No. 09/840,625, filed on Apr. 23, 2001, now Pat. No. 6,579,016, which is a continuation-in-part of application No. 09/616,587, filed on Jul. 14, 2000, now Pat. No. 6,450,706, which is a continuation-in-part of application No. 09/584,561, filed on May 31, 2000, now abandoned.

(51) Int. Cl.
*G03B 17/00* (2006.01)

(52) U.S. Cl. ............... 396/428; 352/243; 212/195; 248/123.2; 248/638

(58) Field of Classification Search ........... 396/419, 396/428; 352/243; 248/123.11, 123.2, 187.1, 248/638; 280/47.11; 348/373; 212/197, 212/347, 348, 350, 195
See application file for complete search history.

(56) References Cited

U.S. PATENT DOCUMENTS

| | | | |
|---|---|---|---|
| 1,971,486 A | | 8/1934 | Jennings |
| 2,156,862 A | | 5/1939 | Maugard |
| 2,224,901 A | * | 12/1940 | Cunningham ............ 248/123.2 |
| 2,447,667 A | | 8/1948 | Raby |
| 3,589,260 A | | 6/1971 | Ferra |
| 3,613,546 A | | 10/1971 | Richardson |
| 4,083,480 A | | 4/1978 | Lee et al. |
| 4,360,187 A | | 11/1982 | Chapman |
| 4,578,708 A | | 3/1986 | Munnion |
| 4,655,567 A | | 4/1987 | Morley |
| 4,657,220 A | | 4/1987 | Lindsay |
| 4,685,649 A | | 8/1987 | McKay |
| 4,849,778 A | | 7/1989 | Samuelson |
| 4,907,768 A | | 3/1990 | Masseron et al. |
| 4,943,019 A | | 7/1990 | Mester |
| 4,989,823 A | | 2/1991 | Chapman |
| 5,054,725 A | | 10/1991 | Bucefari et al. |
| 5,174,593 A | | 12/1992 | Chapman |

(Continued)

FOREIGN PATENT DOCUMENTS

DE 3334428 A1 4/1985

(Continued)

*Primary Examiner*—Alan Mathews
(74) *Attorney, Agent, or Firm*—Perkins Coie LLP

(57) ABSTRACT

A camera crane has a boom arm pivotably connected to a post assembly. A track section is pivotably attached to the front end of the boom arm, and is leveled via leveling rods. The boom arm has a joggled section to provide clearance for a camera operator. A camera frame carrying a camera is linearly moveable along the track section. Pivot joints provide for adjustable drag on pivoting movement, without backlash or slip/stick movement.

16 Claims, 19 Drawing Sheets

U.S. PATENT DOCUMENTS

| | | |
|---|---|---|
| 5,375,863 A | 12/1994 | Chapman |
| 5,463,432 A | 10/1995 | Kahn |
| 5,531,412 A | 7/1996 | Ho |
| 5,644,377 A | 7/1997 | Romanoff et al. |
| 5,652,849 A | 7/1997 | Conway et al. |
| 5,671,932 A | 9/1997 | Chapman |
| 5,730,450 A | 3/1998 | Chapman |
| 5,768,648 A | 6/1998 | Skipp et al. |
| 5,781,814 A | 7/1998 | Chapman |
| 5,856,862 A | 1/1999 | Kokush |
| 5,900,925 A | 5/1999 | Navarro |
| 5,940,645 A | 8/1999 | Bonin |
| 6,135,465 A | 10/2000 | Chapman |
| 6,149,112 A | 11/2000 | Thieltges |
| 6,450,706 B1 * | 9/2002 | Chapman .................... 396/428 |
| 6,478,427 B1 * | 11/2002 | Morris et al. ............... 352/243 |

FOREIGN PATENT DOCUMENTS

| | | |
|---|---|---|
| DE | 3628782 A1 | 3/1988 |
| JP | 64-049483 A1 | 2/1989 |
| JP | 08-068493 A1 | 3/1996 |

\* cited by examiner

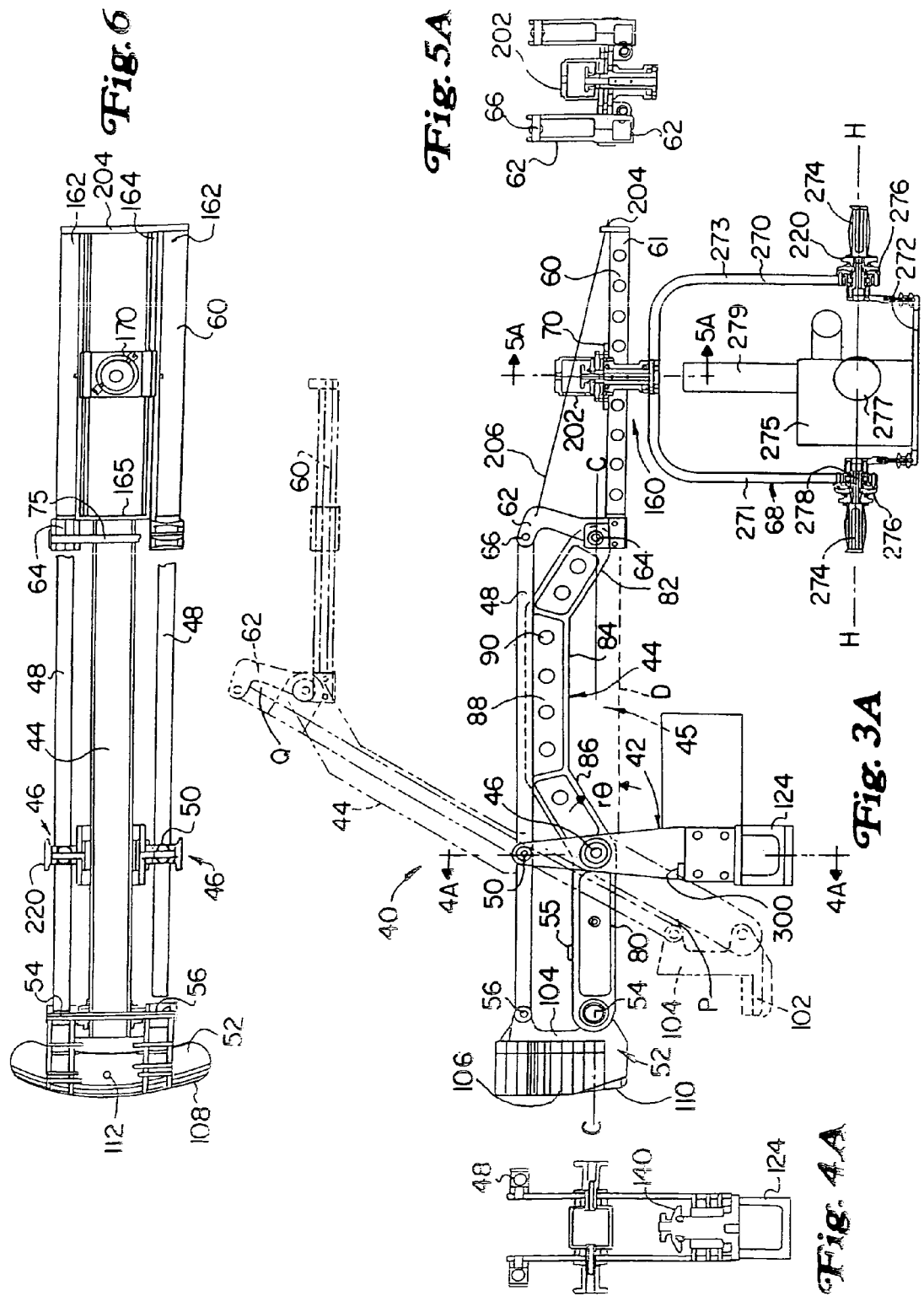

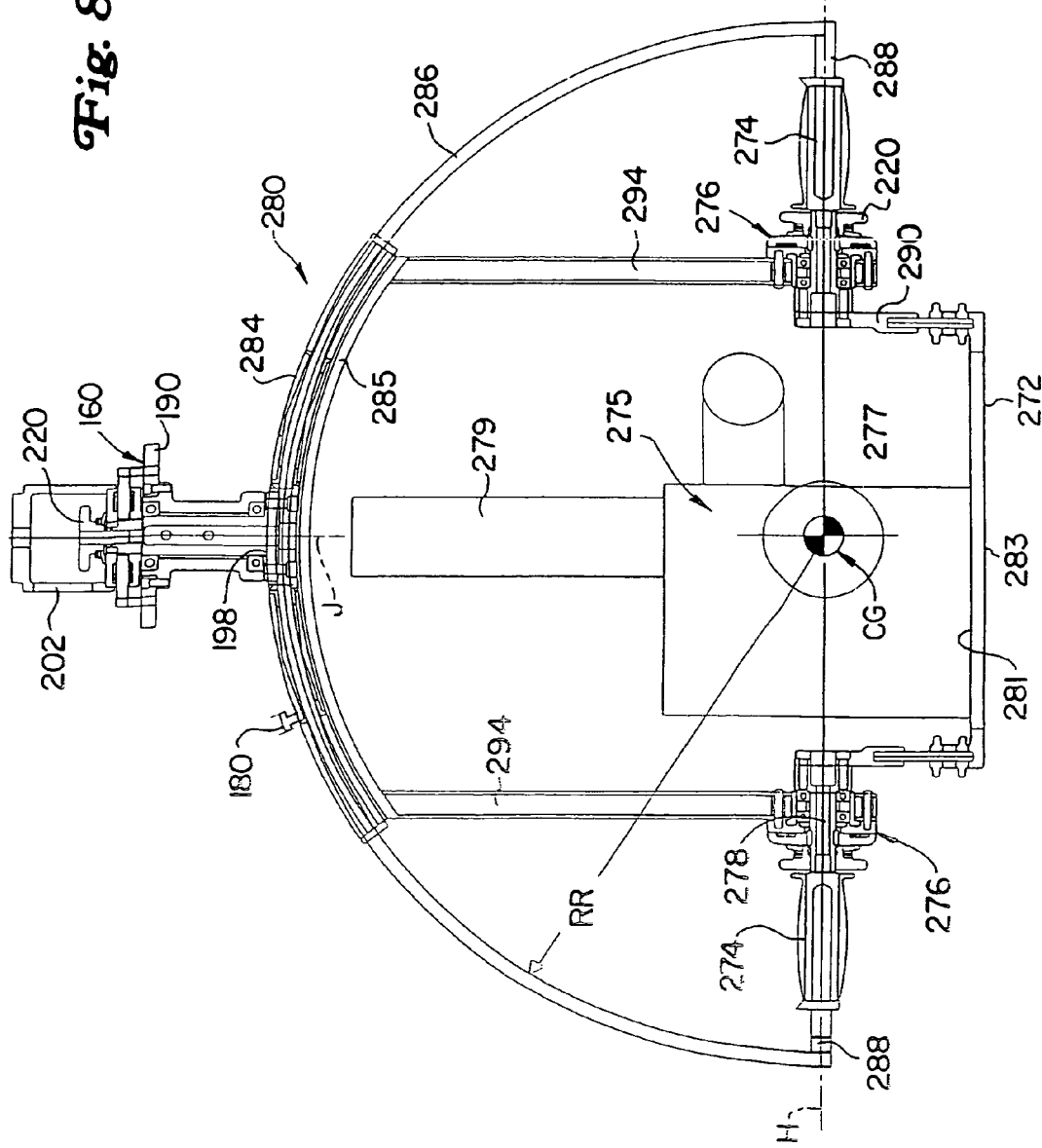

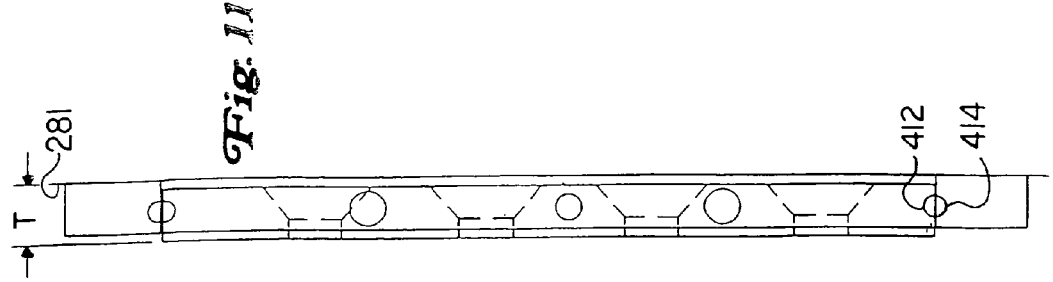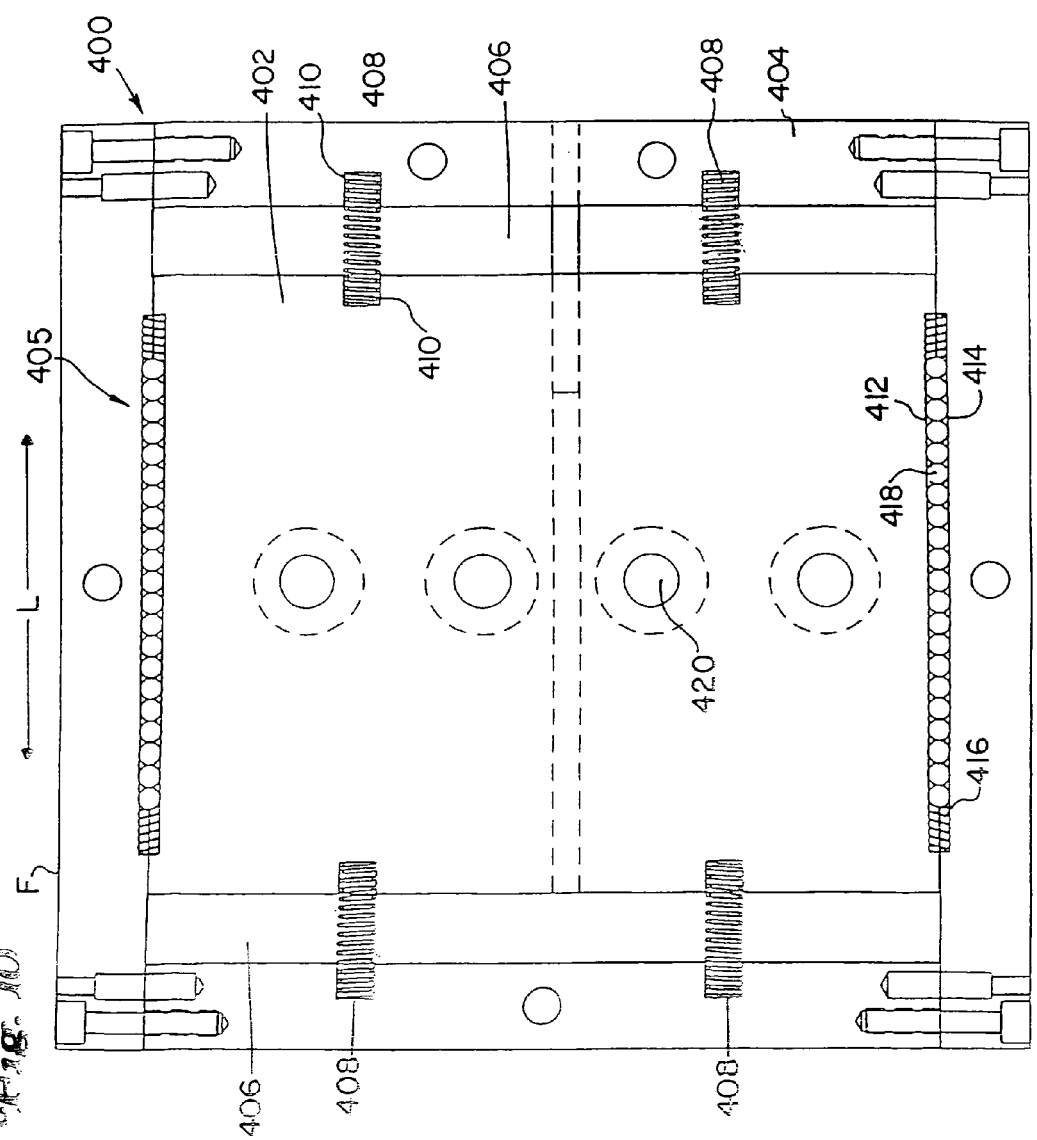

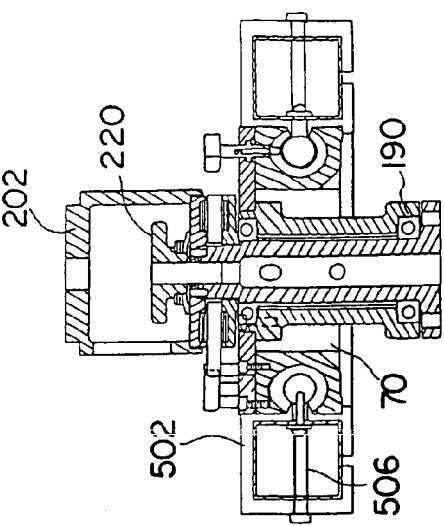
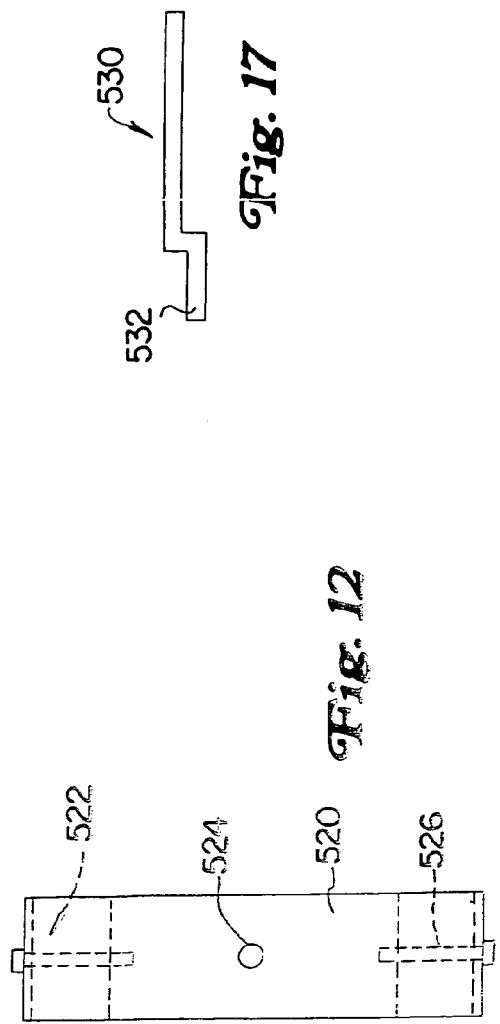
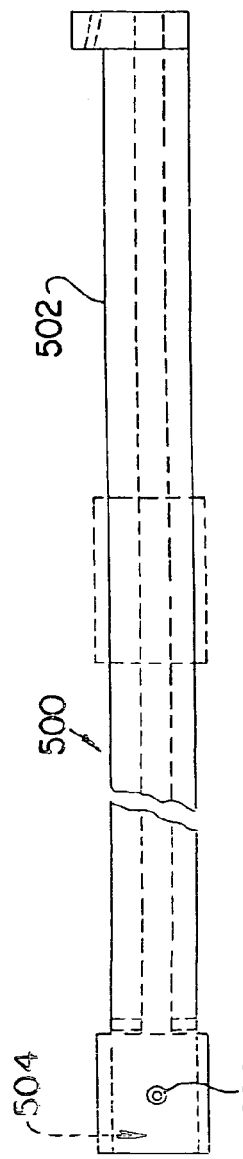

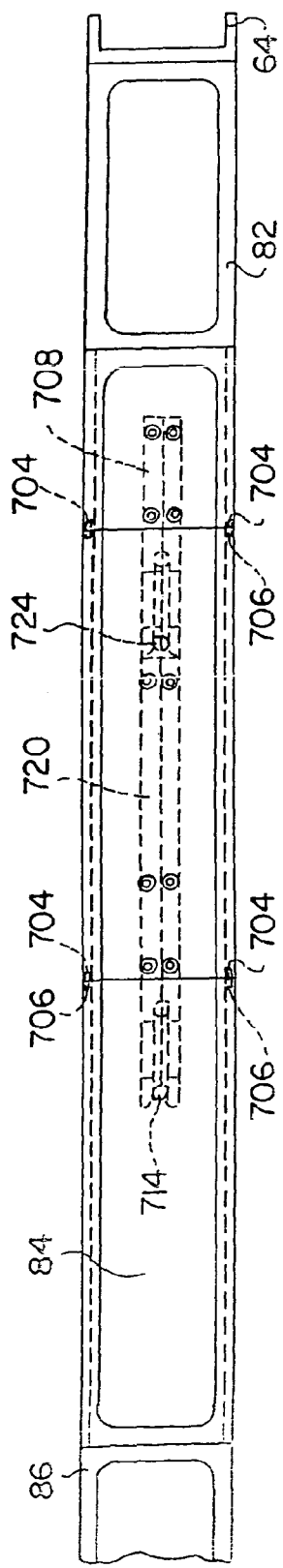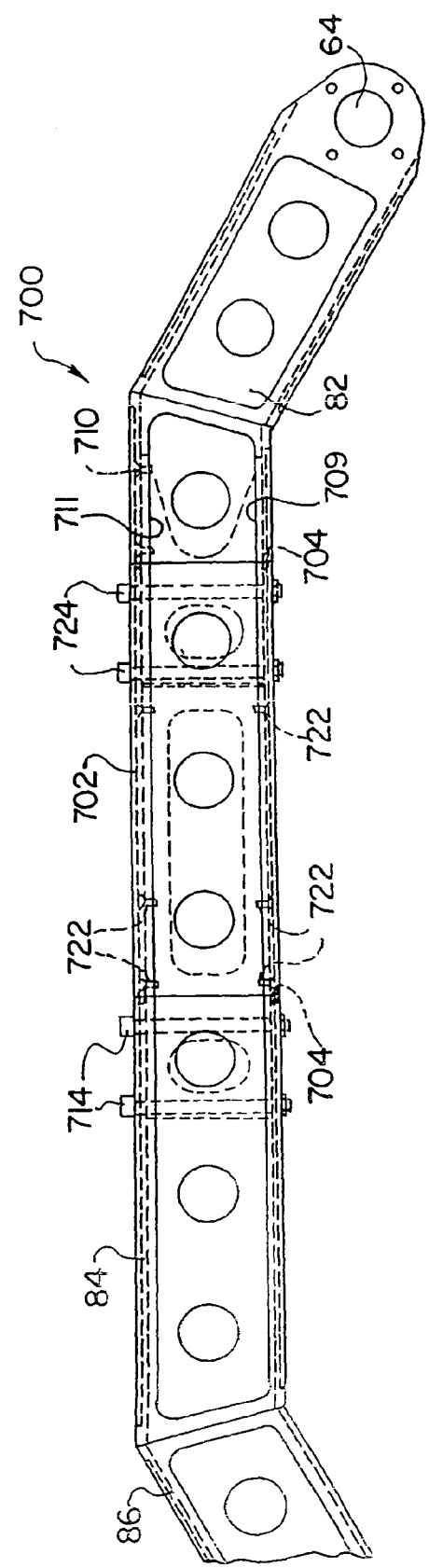
Fig. 19
Fig. 18

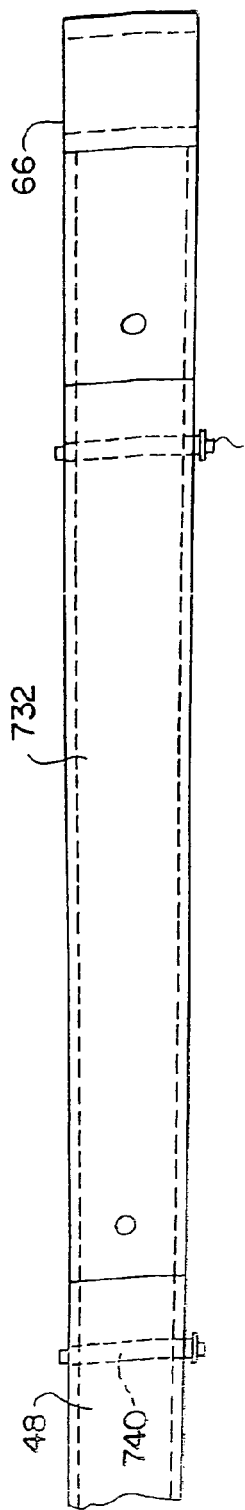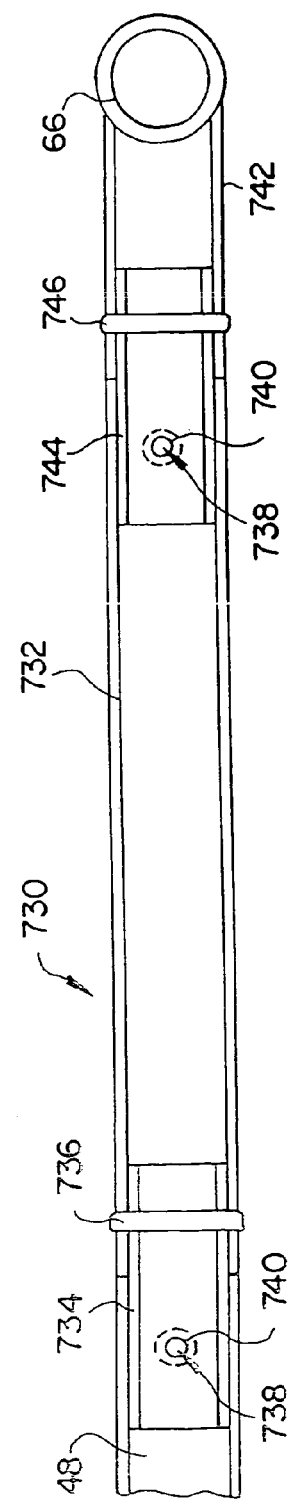
Fig. 21
Fig. 20

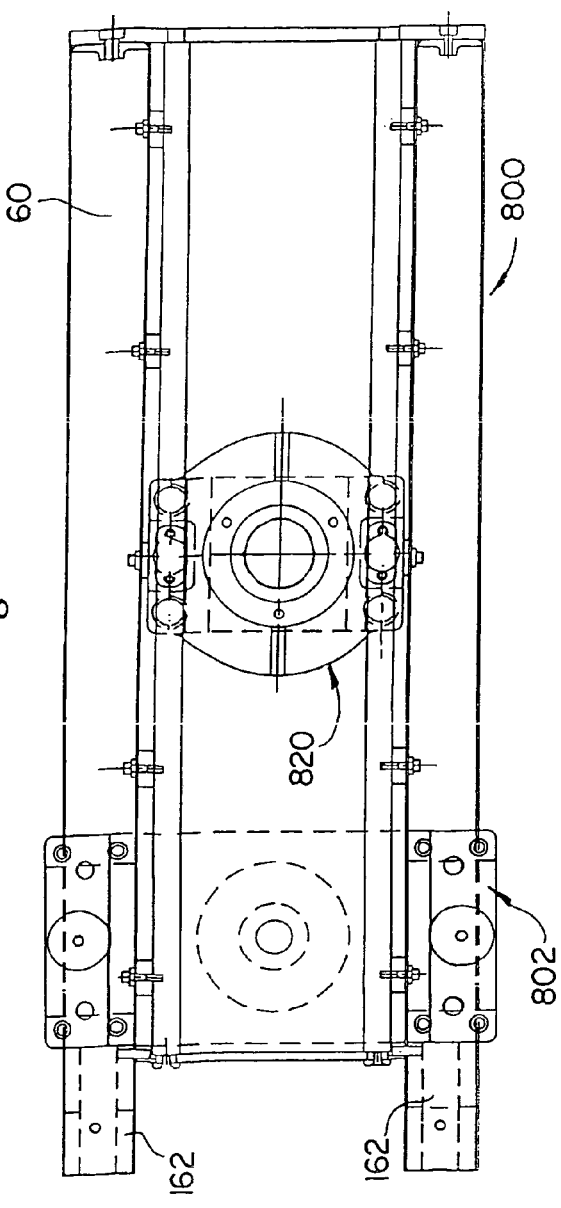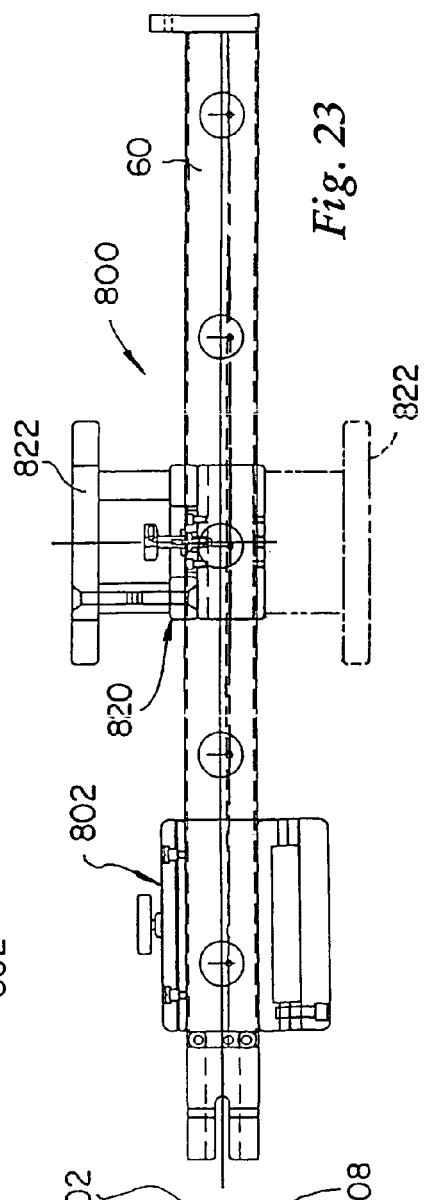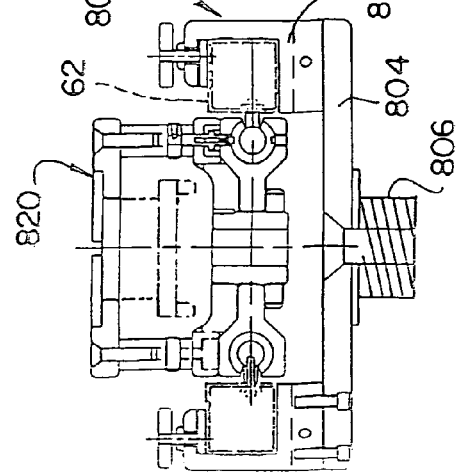

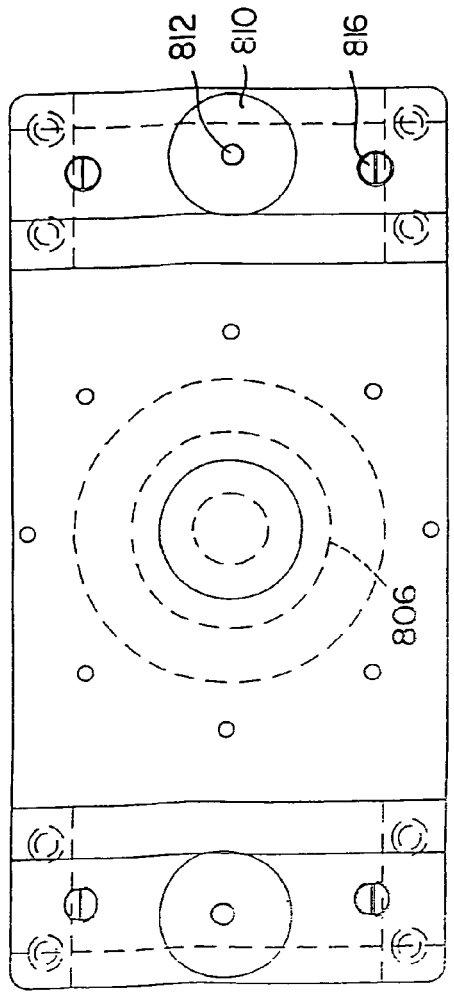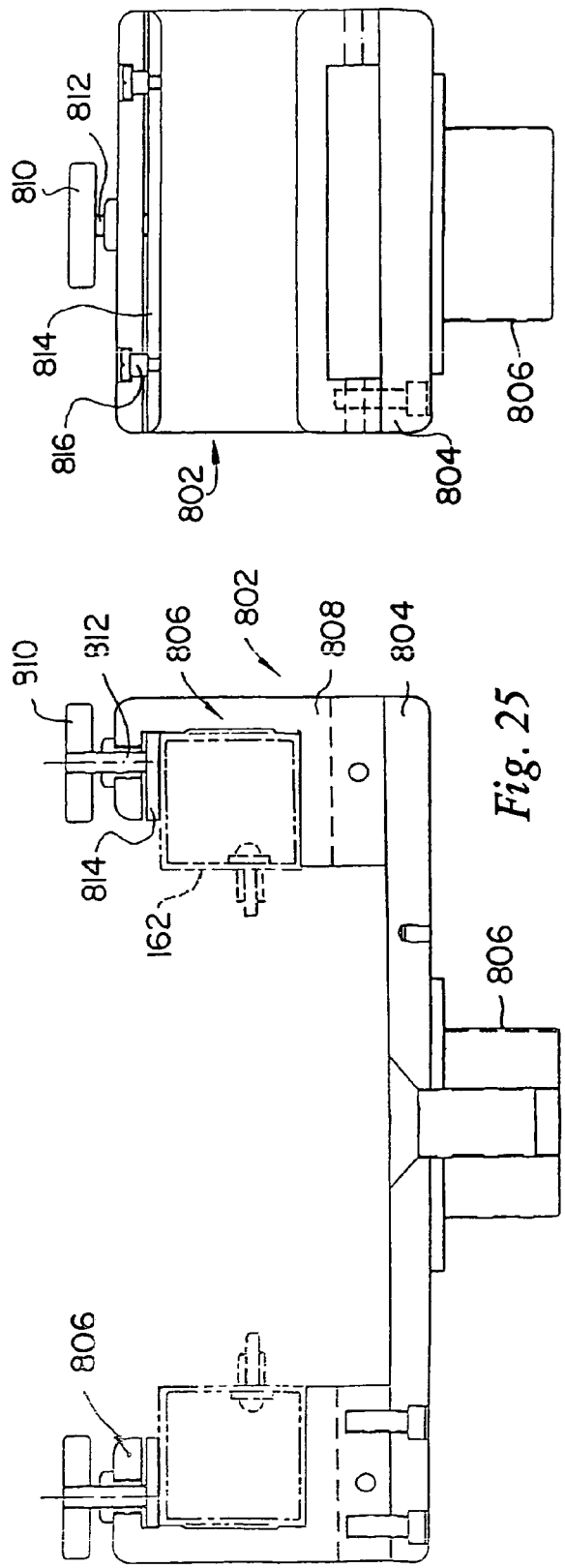

CAMERA CRANE

This Application is a Continuation-in-Part of U.S. patent application Ser. No. 10/462,565, filed Jun. 16, 2003, and now abandoned and retained, which is a Continuation-in-Part of U.S. patent application Ser. No. 09/840,625, filed Apr. 23, 2001, now U.S. Pat. No. 6,579,016, which is a Continuation-in-Part of U.S. patent application Ser. No. 09/616,587, filed Jul. 14, 2000, now U.S. Pat. No. 6,450,706, which is a Continuation-in-Part of U.S. patent application Ser. No. 09/584,561 filed on May 31, 2000, now abandoned. These applications are incorporated herein by reference.

BACKGROUND OF THE INVENTION

The field of the invention is camera cranes.

Camera cranes are often used in motion picture and television production. The motion picture or television camera is typically mounted on a crane arm supported on a mobile base, dolly, or truck. The mobile base may be pushed and steered by hand. Larger units, which have more weight carrying capacity, and longer reaches, typically have electric driving motors powered by onboard batteries. Some mobile bases may also serve as over the road vehicles.

Camera cranes generally have a crane arm supported on a base, with a camera platform at one end of the arm, and a counter weight at the other end. The crane arm can be pivoted by hand to raise and lower the camera, and also to pan to the left or right side. A leveling system is often included to maintain the camera platform in a level orientation, as the camera platform is raised and lowered.

With the development of high definition digital, television cameras, and remote controlled motion picture cameras, filming can be achieved with or without a camera operator behind the camera. Rather, the remotely-controlled camera may be suspended on a crane arm, with the camera operator monitoring the image captured by the camera via a remote monitor, rather than a view finder in the camera. Still, most filming is performed with the camera operator, cinematographer, director, or other person behind the camera, so that the recorded image is viewed in the viewfinder of the camera, and not on a remote monitor.

Due to the variety of filming or video locations, the camera crane arm should advantageously be portable and lightweight. On the other hand, the arm must be rigid enough, when assembled, to resist bending and sagging, and to avoid excessive whipping motion of the camera during crane arm movement.

Mobile bases with crane arms supporting a camera are frequently also used in the television production of sporting events, concerts, and other televised or filmed events. While various camera cranes have been widely known and successfully used, certain disadvantages remain. One disadvantage is that the presence of the crane structure around the camera can interfere with the camera operator, cinematographer, director, etc., e.g., by preventing them from taking a desired position, usually behind the camera. Another disadvantage is the time required to set up a camera crane. Typically, camera cranes are provided in sections which must be bolted together to make a boom arm of a desired length. This requires time, tools, and skill. As production time is usually extremely expensive, even small time savings may be significant.

Accordingly, there is a need for an improved camera crane. There is also a need for an improved camera crane which is light weight and easily transportable, but yet which can steadily carry significant payloads, and which can position and support a camera in a wide range of positions and orientations, while also avoiding excessive interference with the camera operator. There is a further need for a camera crane which can be quickly and easily set up, preferably without the need for tools.

SUMMARY OF THE INVENTION

To this end, a camera crane includes a boom arm pivotally connected to a post assembly adapted to be supported on a camera dolly. A track section is attached at the front end of the boom arm, and a counter weight platform is attached at the back end of the boom arm. Leveling rods extending between the track section and counter weight platform to maintain the track section and counter weight platform in a horizontal orientation, as the boom arm is pivoted or tilted up and down, to change the elevation of the camera. A camera frame is linearly movable along the track section. As a result, the camera can be easily moved into a wide range of positions.

In a second and separate aspect of the invention, the boom arm has a joggle section, to provide additional head room clearance around the camera.

In a third and separate aspect of the invention, the camera frame is rotatably supported on the track section, so that the camera can pan continuously in either direction, clockwise or counter-clockwise.

In a fourth and separate aspect of the invention, a camera platform is pivotally or rotatably attached to the camera frame. The camera is attached to the camera platform. As a result, the camera can continuously change elevation angle, with the camera lens positioned, e.g., vertically straight up or straight down, and at any angle in between.

In a fifth and separate aspect of the invention, and counter weight platform and counter weights are concave with a rounded back surface, to minimize the clearance space needed to turn the boom arm, while providing an extended range of camera lens height.

In a sixth and separate aspect of the invention, and anti-backlash or motion control pivot joint or device is provided on the boom arm and camera frame, to provide for smooth dampened back lash free movement.

In a seventh and separate aspect of the invention, a lightweight one piece camera crane is provided which can be quickly set up without tools.

In an eight and separate aspect of the invention, a track section on the crane can be quickly removed and replaced with an accessory to provide different camera mounting positions and a more compact and lightweight design.

In a ninth and separate aspect of the invention, roll movement is provided via an alternative camera frame design or via a roll movement accessory attached to a camera a base plate supported by the crane.

In a tenth and separate aspect of the invention, the track section is attached to the boom arm via a pivot joint. This allows the entire track section to pivot from an upright or zero degree position, to a 90 degree position, or beyond. Camera balancing and versatility of movement is improved.

In an eleventh and separate aspect of the invention, a support member is attached to front and rear sections of the crane arm about a pivot joint on the post assembly. This feature allows the crane arm to be longer than typical crane arms.

In a twelfth and separate aspect of the invention, a braking member is pivotally attached to the post assembly at the pivot joint and moveable along the support member. The braking member is tightenable against the support member to aid in counteracting drag forces that act on the crane arm.

The invention resides as well in sub combinations of the features as described below.

Additional features and advantages will appear hereinafter.

BRIEF DESCRIPTION OF THE DRAWINGS

In the drawings, wherein the same reference number indicates the same element, throughout the several views:

FIG. 3A is a side elevation view of the boom arm shown in FIGS. 1 and 2;

FIG. 4A is a section view taken along line 4A—4A of FIG. 3A;

FIG. 5A is a section view taken along line 5A—5A of FIG. 3A;

FIG. 6 is a plan view of the camera crane of FIG. 3A;

FIG. 8 is a front view, in part section, or an alternative camera frame for use with the crane shown in FIG. 3A;

FIG. 9 is a side view of the camera platform support plates shown in FIG. 8;

FIG. 10 is a plan view of a vibration isolator for use with the camera crane shown in FIGS. 1–3A;

FIG. 11 is a side view thereof;

FIG. 12 is a top view of mounting block for use with a removable track section;

FIG. 13 is side of a removable track section;

FIG. 14 is front end view of the removable track section installed on the crane shown in FIGS. 1–6;

FIG. 17 is a side view of another accessory;

FIG. 18 is a side view of an alternative boom arm, including an extension section;

FIG. 19 is a top view thereof;

FIG. 20 is a side elevation view of a leveling rod for use with the boom arm shown in FIGS. 18 and 19;

FIG. 21 is a top view thereof;

FIG. 22 is an end view of a track section accessory, which may be attached directly to the platform of a camera dolly, such as the camera dolly shown in FIG. 1, or to other dollies or cranes;

FIG. 23 is a side view thereof;

FIG. 24 is a top view thereof;

FIG. 25 is an end view of the track section frame shown in FIGS. 22–24;

FIG. 26 is a side view thereof;

FIG. 27 is a top view thereof;

DETAILED DESCRIPTION

Figure 1:
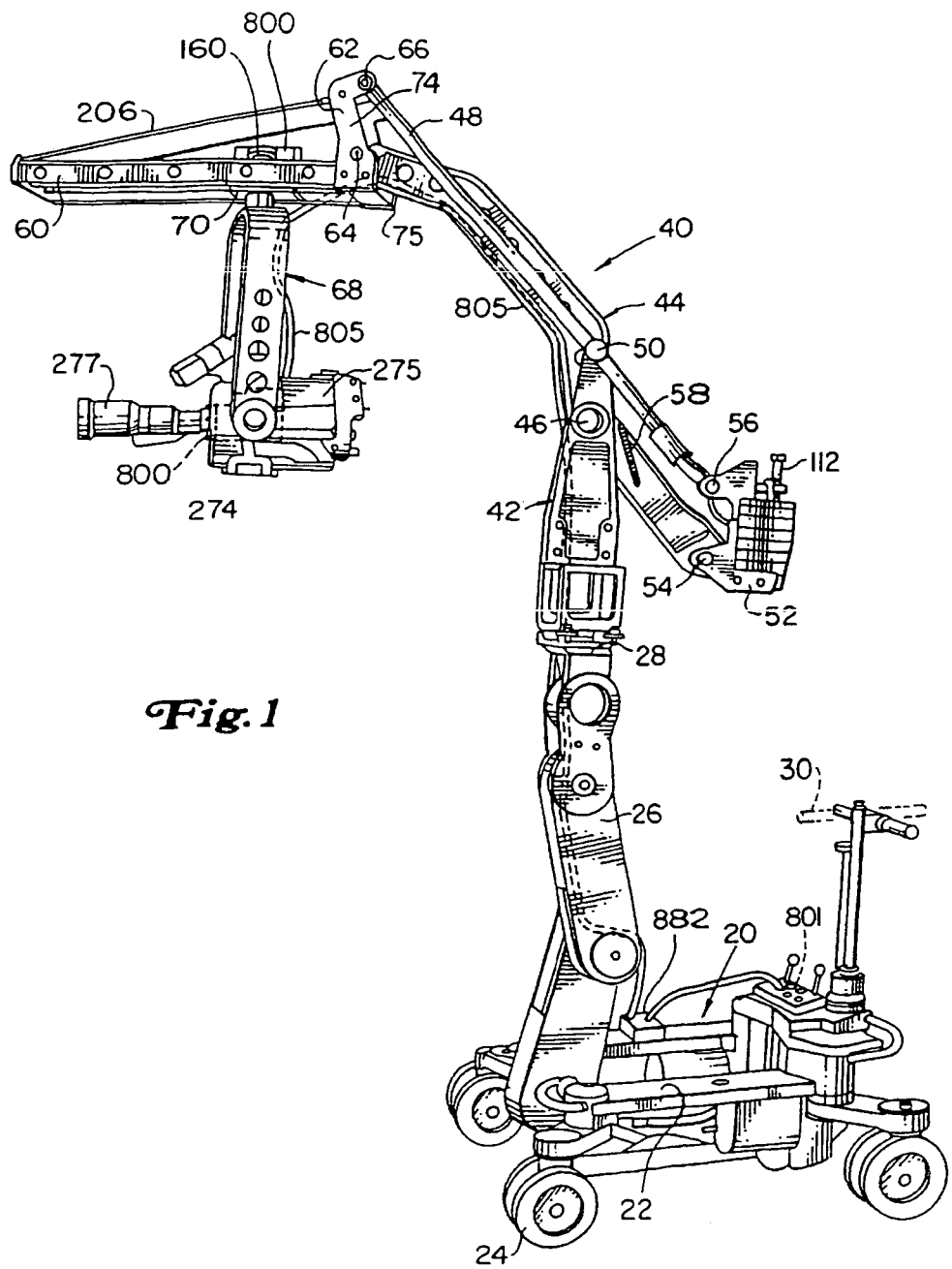
FIG. 1 is a perspective view of the present camera crane mounted on a camera dolly, with the crane boom arm in an elevated position.
Figure 2:
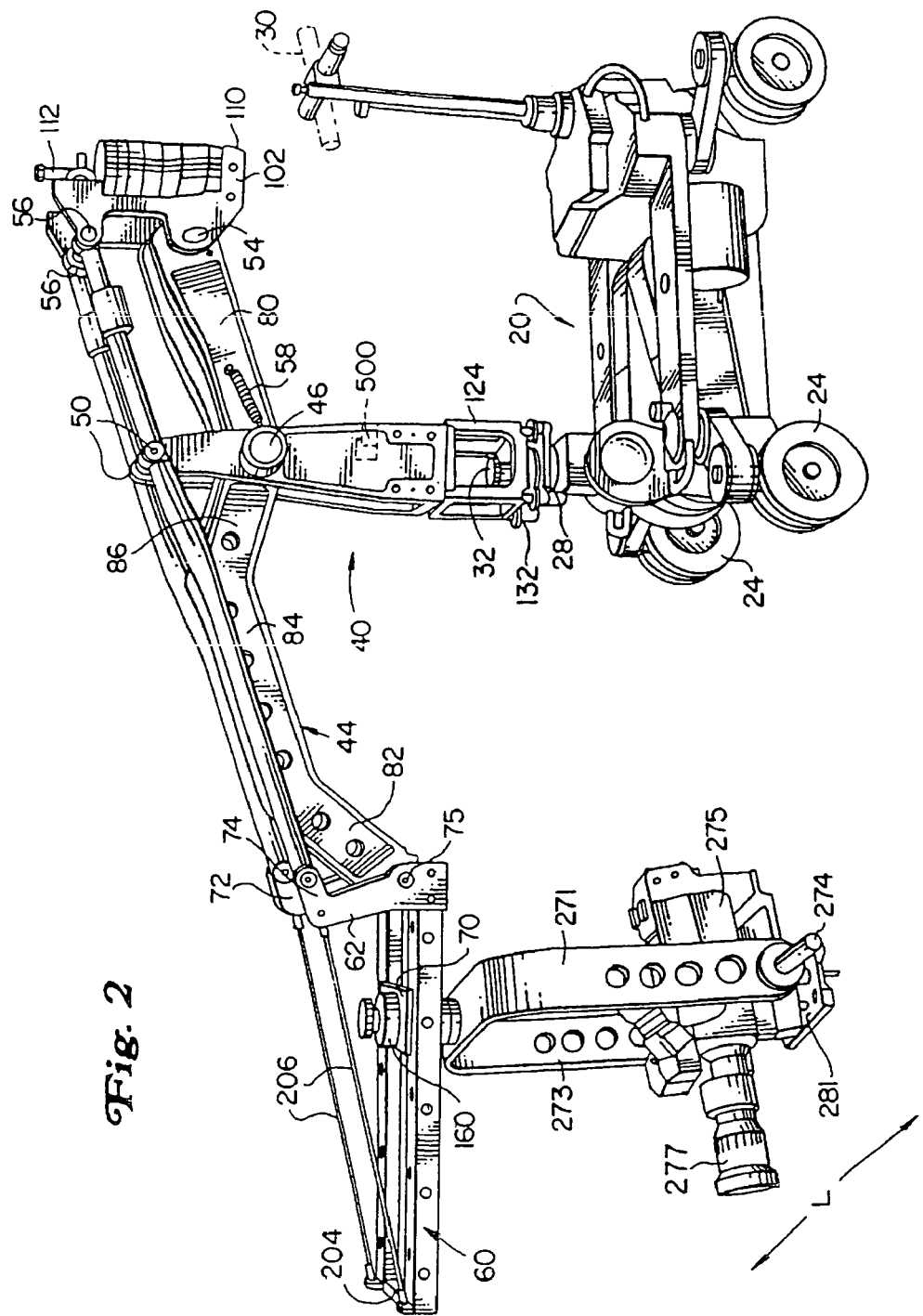
FIG. 2 is a perspective view thereof with the boom arm in a lowered position.

Turning now in detail to the drawings, as shown in FIGS. 1 and 2, a camera crane 40 is supported on a dolly platform 28 of an arm 26 of a camera dolly 20. The dolly wheels 24 and arm 26 are attached to a dolly chassis 22. The camera dolly is described in detail in U.S. patent application Ser. No. 09/055,012, and U.S. Pat. No. 4,360,187, incorporated herein by reference.

Referring to FIGS. 1–3A, the crane 40 includes a boom arm 44 pivotally supported on a post assembly 42. The post assembly 42 is pivotably attached to a head frame 124 which is connected to the dolly platform 28. The head frame includes a leveler 132 having jack screws or other leveling devices, such as described in U.S. Pat. No. 6,086,207, incorporated herein by reference. The leveler 132 allows the entire crane 40 to be leveled with respect to the dolly platform 28.

The boom arm 44 is pivotally connected to the post assembly 42 for vertical movement at a boom arm center pivot joint 46. A pair of leveling rods 48, are spaced apart on either side of the boom arm 44. The leveling rods 48 are also pivotally attached to the post assembly 42 at leveling rod center pivot joints 50.

A counter weight platform 52 is pivotally attached to the boom arm 44 at a boom arm rear pivot joint 54. The leveling rods 48 are similarly attached to the counter weight platform at leveling rod rear pivot joints 56.

A track section 60 is rigidly attached to a track section arm 62. The track section arm 62 is pivotally attached to the front end of the boom arm 44 at a boom arm front pivot joint 64. The leveling rods 48 are similarly pivotally attached to the track section arm 62 at leveling rod front pivot joints 66.

Referring still to FIGS. 1–3A, the boom arm 44 has a rear segment 80 which is parallel to the leveling rods 48, and which is horizontal, when the boom arm 44 is horizontal. A first front segment 82, second front segment 84, and third front segment 86 are joined together, with the third front segment 86 also joined to the rear segment 80. As shown in FIG. 3A, the third front segment 86 is joined at a rise angle to the rear segment 80. The angle θ is generally from 15–45°, and preferably about 30°. The second front segment 84 is joined to the first front segment 82 at an angle supplementary to angle θ, so that the second front segment 84 is parallel, but vertically offset, from the rear segment 80. The third front segment 86 is likewise joined to the second front segment 84 at angle negative θ. The first front segment 82 preferably is of the same length as the third front segment 86, so that the upward rise resulting from the inclined third front segment 86 is equally offset by the decline of the first front segment 82. As a result, the pivot joints on the boom arm 44, i.e., the boom arm rear pivot joint 54, the boom arm center pivot joint 46, and the boom arm front pivot joint 64, are all aligned on the center line C—C. However, a head room space, generally designated 45 in FIG. 3A, is formed between the boom arm 44 and the floor. As a result, the camera operator has additional vertical clearance space or head room, extending from line D to the bottom surface of the boom arm 44.

The segments 80, 82, 84 and 86 are preferably formed from an aluminum 4"×4" square beam tube extrusion, having a ¼ inch wall thickness, wedge cut to form the angle joints which are pressed closed, and then welded. To reduce weight, the central areas of the sides, top and bottom surfaces of the boom arm 44 are reduced in thickness, forming relieved wall sections 88, on all surfaces. In addition, lightening holes 90 are advantageously provided along the center lines of each of the front segments, on the sides, top and bottom. The relieved sections 88 are preferably made by reducing the wall thickness of the box beam used to form the boom arm 44 from ¼ inch to ⅛ inch, thereby reducing the weight of the boom arm 44 by almost 50%. The metal thickness at the edges is retained for improved rigidity and weld strength. As the majority of the surfaces of the boom arm are relieved areas, they have increased protection against scratches and other damage.

Referring to FIG. 3A, the counter weight platform 52 is formed by a bottom plate 102 and a front wall 104. A weight post 112 extends vertically upward from the bottom plate 102. Counter weights 106 are stacked onto the counter weight platform 52, with the post 112 extending through clearance holes in the counter weights 106. As shown in FIG. 6, the counter weight 106 have a radiused back surface 108. This allows the boom arm 44 to pivot about on the dolly platform 28 with a minimum of clearance.

As shown in FIG. 3A, the bottom plate 102 also has a forwardly curving relieved section 110, to allow the counter weight platform 52 to better clear the dolly steering handle 30, as shown in FIG. 2, when the handle is at 90°. Also, as show in FIGS. 3A and 6, the camera frame 68 is rotatably attached to a frame slider plate 70 which is slidable forward and back on the track section 60.

Figure 4B:
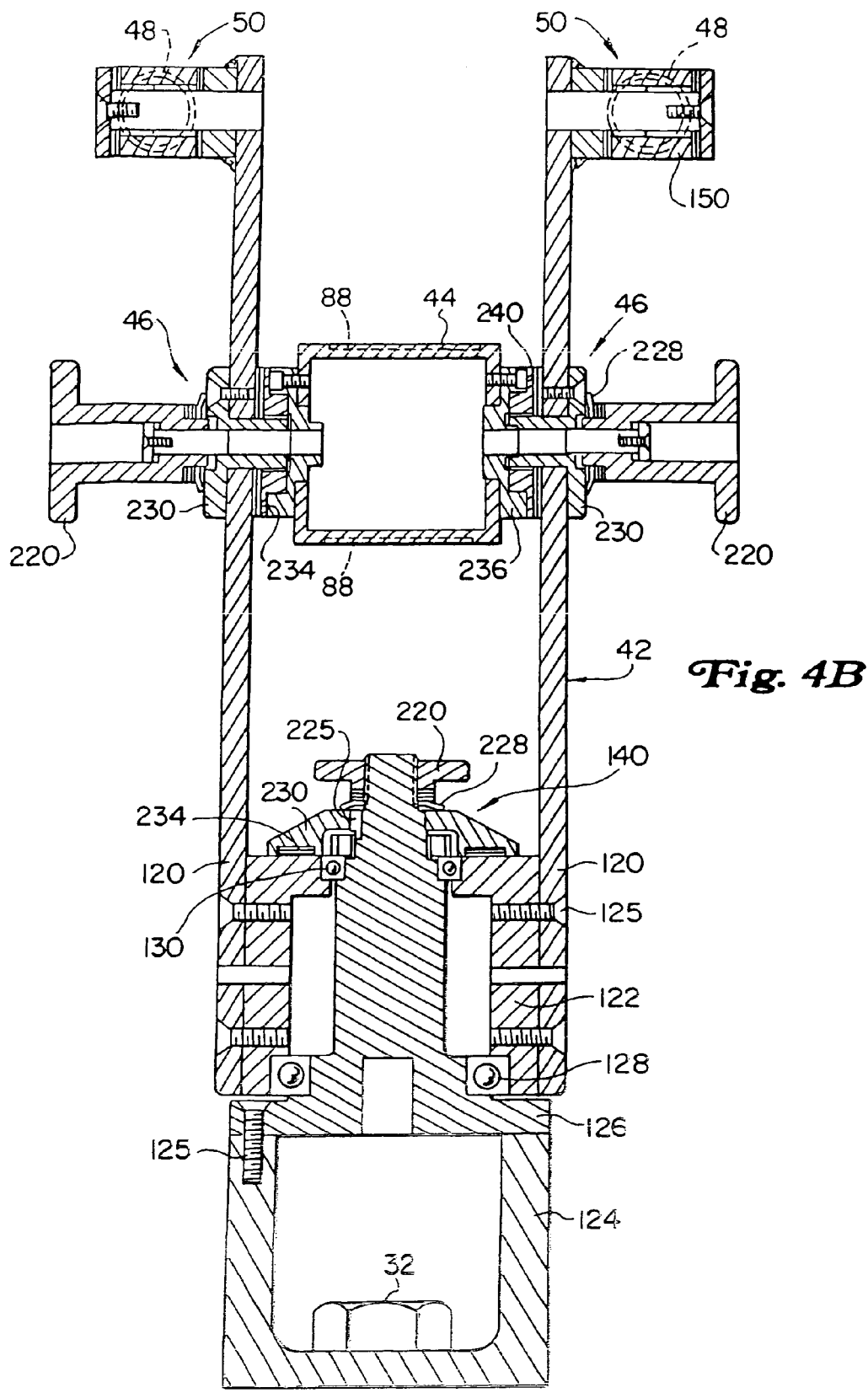
FIG. 4B is an enlarged view of FIG. 4A.

Referring to FIG. 4B, the post assembly 42 includes spaced apart slide plates 120 attached to a base collar 122 via bolts 125. The base collar 122 is rotatably supported on an axle 126, via an upper bearing 130 and a lower bearing 128. The axle 126 is bolted on to the head frame 124, which in turn is secured to an upper plate or structure of the leveler 132. A lower section of the leveller is attached to the dolly platform 28 with a threaded knob 32. A crane pan pivot joint 140 is located between the side plates 120 and on top of the axle 126. The crane pan pivot joint 140 adjusts the drag or braking force when pivoting the crane 40 about the head frame 124 and camera dolly platform 28. Lateral stubs 50 extend outwardly from the top ends of the side plates 120, to support the leveling rod center pivot joints 50. A key 225 irrotatably secures the cap plate 230 to the axle 126.

Figure 5B:
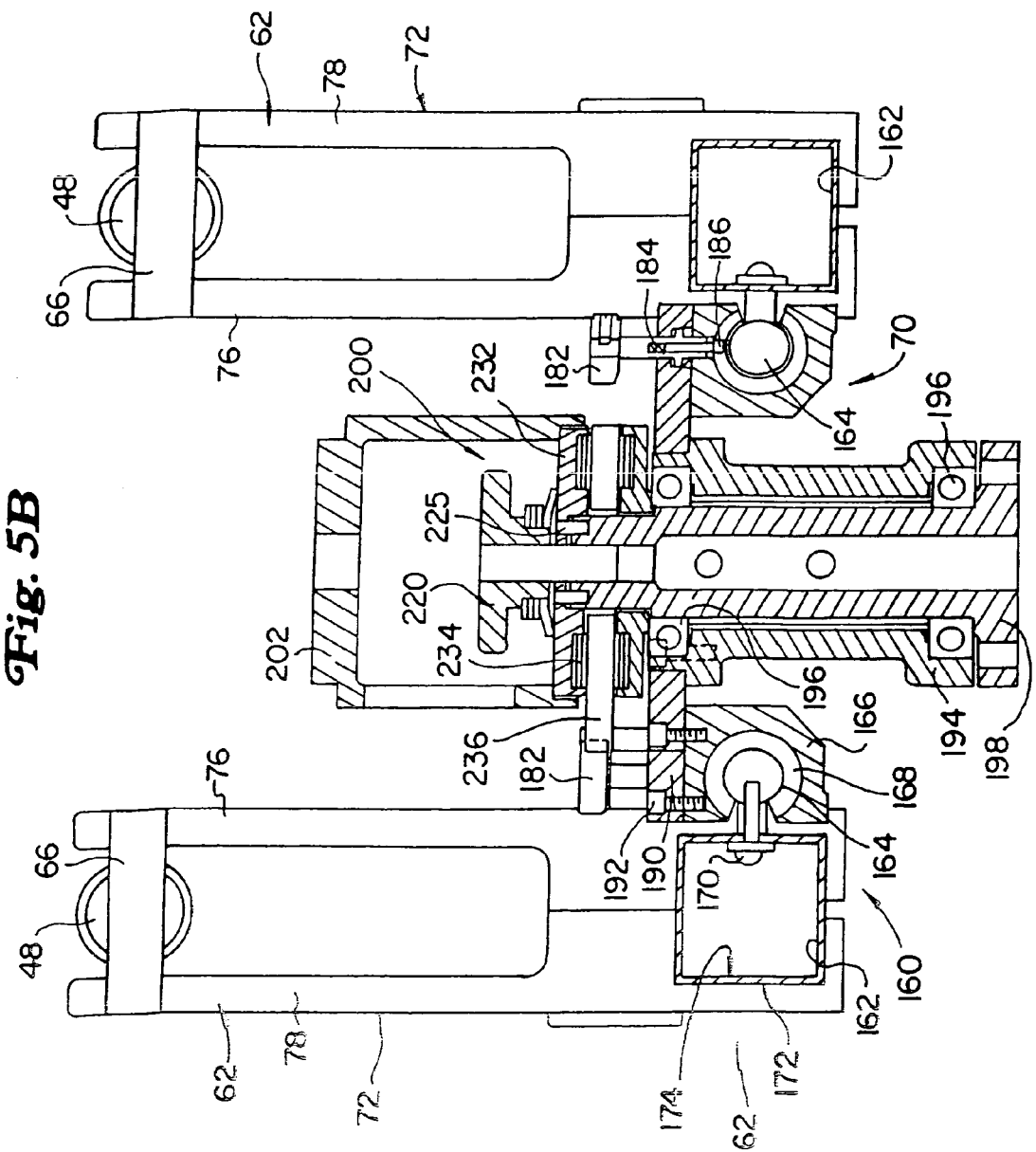
FIG. 5B is an enlarged view of FIG. 5A.

As shown in FIGS. 3, 5B and 6, the track section 60 includes two square track tubes 162 attached to and extending parallel and forward from the track section arm 62. The track tubes 162 are preferably made of stainless steel two inch by two inch square tubes with a 0.083 wall thickness. The track section 62 includes left and right arm assemblies 72 and 74 fixed to and joined by a cross shaft 75. Each of the arm assemblies 72 and 74 includes inner and outer plates 76 and 78, with the leveling rod front pivot joints 66 positioned between the inner and outer plates from both the left and right arm assemblies 72 and 74, as shown in FIG. 5B.

Referring still to FIG. 5B, the frame slider plate assembly 70 is slidable front to back on track bearing rails 164 attached to the inside of each track tube 162, via rail bolts 170. Bearing blocks 166 are attached to the slide plate 190 with fasteners 192. Clearance holes 172 are provided on the outside of the track tubes 162, to access to bolts 170. A linear rod bearing 168 is secured within the bearing block 166, on each side, and allows the frame slider plate assembly 70 to slide front to back on the track bearing rails 164 with low friction. The track section 60 in the embodiment shown allows for 24 inches of sliding horizontal linear travel. The back ends of the track rails 164 are attached to a bridge plate 165 extending between the track tubes 162 at the back end of the rail section 60. The front ends of the track tubes 162 are attached to the front end plate 204.

A frame slider plate assembly drag adjuster 180 on the slide plate 190 has a bushing 186 on the tip of a thumb screw 182 threaded into the slide plate 190. A spring 184 urges the bushing 186 outwardly into sliding engagement against the track bearing rail 164. The sliding friction of the frame slider plate assembly 70 along the track bearing rails 164 is adjusted by turning the thumb screw at 182, which increases or decreases the spring engagement force of the bushing 186 against the track bearing rail 164. The slide spring plate 190, and thus the camera frame 68, can be locked in place on the track bearing rails 164 by sufficiently tightening the thumb screw 182.

A plate collar 194 is fixed within a central opening of the slide plate 190, and extends downwardly from the slide plate 190. A track axle 198 is rotatably supported within the plate collar 194 by upper and lower bearings 196. The drag force on rotation of the track axle is adjusted with a track axle pivot joint 200.

Tension wires 206 optionally extend from the end plate 204 to the left and right arm assemblies 72 and 74, as shown in FIGS. 1 and 2.

Figure 7:
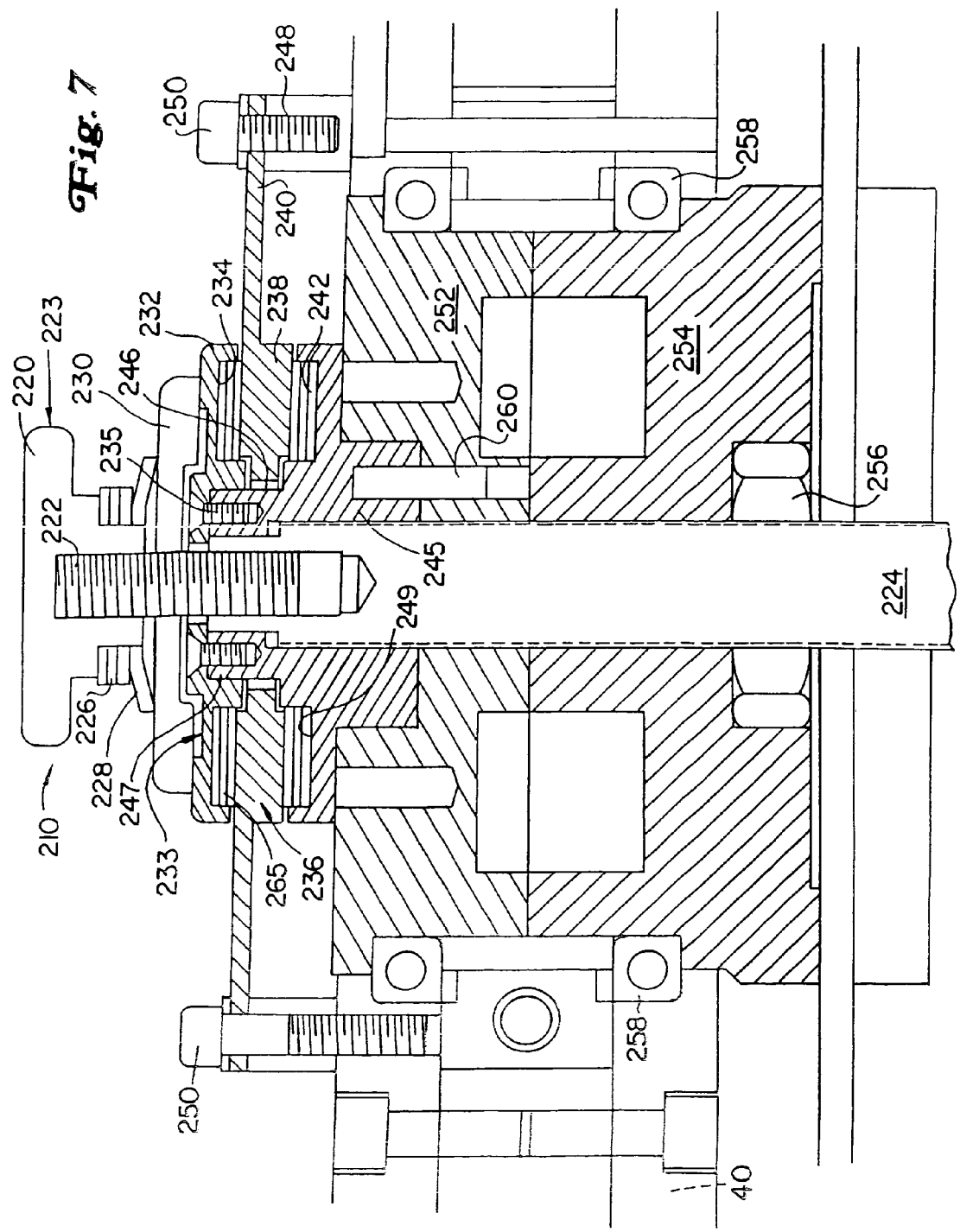
FIG. 7 is an enlarged section view of the anti backlash joints shown in FIG. 3A.

FIG. 7 shows the detailed construction of the non-slip/ stick drag or pivot joints 210 used on the crane 40. The joint 210 shown in FIG. 7 is preferably used for all pivot joints on the crane 40 which have adjustable tension or drag features, specifically, the crane pan pivot joint 140 shown in FIG. 1B, the boom arm center pivot joints 46 (left and right) shown in FIG. 4B, and the camera frame pivot joint 160, as shown in FIG. 5B. While the Figures show other optional designs for the joints 140, 46, and 160, the joint construction shown in FIG. 7 is preferred for all such joints.

Turning in detail to FIG. 7, a stud section 222 of a hand knob 220 is threaded into an axle 224 forming a tensioner 223. The axle extends through an outer hub 252 and an inner hub 254 and is clamped in place by a hub nut 256. A needle thrust bearing 226 under the hand knob 220 press against a compression washer 228, which in turn presses on a floating cap plate 230, as the hand knob 220 is tightened. Other forms of tensioners, such as cams, levers or springs, may also be used in place of the hand knob and screw threads, to adjust drag joint friction.

An arm plate 236 is positioned between the flex plate 232 and axle hub 245 secured to the outer hub 252 via a pin 260. The arm plate 236 has arms 240 extending out from opposite sides of a ring section 238. The arm plate 236 is pivotally or rotatably positioned over a hub section 247 of the axle hub 245, on a DU bushing 246. A stack of Teflon rings 234 are contained within the flex plate 232, and are compressed between the flex plate 232 and the upper surface of the ring section 238 of the arm plate 236. Similarly, a stack of lower Teflon rings 242 are positioned between the lower surface of the ring section 238 of the arm plate 236, and a receiving groove 249 formed in the upper surface of the axle hub 245.

The flex plate 232 is attached to the axle hub 245 via fasteners 235. The arms 240 of the arm plate 236 are attached to the moving section, such as the boom arm 40 by clamping screw 250 extending into standoffs 248. The moving section, such as the boom arm is pivotally or rotatably supported on the hub bearing 258 on the outer hub 252 and inner hub 254.

A heavy grease 265 is provided between each of the rings 234 and 242, as well as between the top ring and the flex plate, and the bottom ring and the receiving groove 249, to further reduce friction.

Referring still to FIG. 7, the arm plate 236 pivots or rotates with the moveable section, such as the boom arm 40 or the track axle 198, while the other components remain fixed in place. The drag or braking force of the pivot joint 210 is adjusted by turning the hand knob 220. As the hand knob 220 is tightened down, the floating cap plate 230 presses down and deflects the flex plate 232 slightly, increasing the normal force clamping the flex plate 232, Teflon rings 234 and 242 and arm plate 236 together, thereby increasing the drag force. The flex plate has an annular undercut area 233 which allows the flex plate to deflect under clamping force from the cap plate 230. The deflection is generally up to 0.006 inches. When the arm, or other moveable component using the pivot joint is brought to a stop, there is no backlash, stick-slip, or other force tending to move the arm out of position, as can occur with other types of pivot joints.

Referring to FIGS. 3A and 5B, the camera frame 68 is rigidly attached to the track axle 198 in the frame pivot joint 160. This allows the camera frame 68 to pivot or rotate, as well as translate in and out along the track section 60.

As shown in FIG. 3A, the camera frame 68 includes a U-section 270 suspended from the track axle 198. A base plate 272 is pivotally supported on each of the arms 271 and 273 of the U-section 270, via hand grip joints 276. The hand grip joints 276 preferably have the same construction as the other pivot joints, such as the frame pivot joint 160 and the boom arm pivot joint 46, which construction is shown in FIG. 7. However, hand grips 274 are threaded into a hub 278 attached to the camera platform 272. Turning the hand grips 274 tilts the camera platform up or down, while turning the knobs 220 sets the drag or friction on such tilting movement.

The figures are draw in proportion and to scale and generally accurately show the relative sizes and positions of the components described. As shown in FIG. 3A, the U-section 270 has a width of approximately equal to the length of the rear segment 80. This width provides space for mounting a wide variety of cameras, and includes vertical clearance for a film magazine 279, and a viewfinder on the camera 275. The distance between the center line H—H of the hand grip joints 276 and the base plate 272 is set so that the line H—H passes through the center of gravity of the camera. Consequently, the base plate 272 is preferably attached to the U-section 270 so that the spacing between the plate 272 and line H—H can be quickly and easily changed, e.g., via slotted holes, etc. By setting the center of gravity of the camera 275 on line H—H, no moment is generated tending to change the elevation angle of the camera lens 277, regardless of the elevation angle. Consequently, if desired, the hand grip joints 276 can be set to virtually no drag force, without having the camera drift or shift inadvertently in elevation.

Referring to FIGS. 2–3A in use, a camera 250, such as a video, television or motion picture film camera 275 is mounted on the base plate 272, with the center of gravity of the camera 275 on line H—H passing through the hand grip joints 276. With the crane 40 attached on top of a dolly platform 28 of a camera dolly 20, counter weights 106 are added on to the counter weight platform 52, until the boom arm 44 is balanced. This balancing may be performed with the camera frame 68 at any position along the track section 60. The distance between the boom arm front pivot joint 64 and the boom arm center pivot joint 46, in the embodiment shown, is twice the distance between the boom arm center pivot joint 46 and the boom arm rear pivot joint 54. Of course, other ratios may be selected. While the short length of the crane 40 behind the post assembly 42 provides for a more compact and versatile design, it requires counter weights 160, even with no camera pay load on the camera platform 272. In the embodiment shown in the drawings, with no camera payload, the boom arm 42 is counterbalanced with about 95 pounds on the counter weight platform 52. Payloads may range from 10–100 lbs. with a preferred maximum of about 60 lbs.

To set up the crane for use, the camera is attached to the camera platform 272. Counter weights 106 are added until the arm is balanced, preferably with the crane in a horizontal position. Referring to FIG. 3A, once the crane is balanced, it will remain balanced, regardless of the in/out position of the camera frame 68. Although the center of gravity of the entire crane 40 will change with in/out movement of the camera frame 68, the arm 44 will remain balanced. This occurs because the downwardly vertical force acting through the joint 64, resulting from the weight of the camera frame 68 (and the entire track section 60) does not change as the camera frame 68 moves in and out. The moment exerted about the joint 64 changes with movement of the camera frame 68 and its camera payload. Consequently, with the camera frame 68 at the very front or out position, next to the end plate 204, the moment acting about the joint 64 is at a maximum. However, this moment is countered by the tension in the leveling rods. As the vertical force acting downwardly through the pivot joint 64 remains unchanged, the boom arm remains balanced, regardless of the front to back movement of the camera frame 68. Thus, after the boom arm is balanced, it will remain balanced, regardless of the movement or position of the camera frame 68 and the camera payload. Bubble levels 55 attached to the boom arm may be used for the initial leveling step.

As the boom arm moves from horizontal towards a more vertical up or down position, less force is required to counter balance the weight of the pay load, and the weight of the boom arm forward of the joint 46. This occurs because as the arm moves from horizontal to vertical, the stresses change from bending to compressive stresses. As a result, the shape of the arm changes slightly, and it becomes straighter. As the arm becomes straighter, the distance between the pivot joint 46 and the center of gravity of the load forward of the joint 46 decreases, so that less counterweight is needed. An arm spring 58 extending between the rear segment 80 and the post assembly 42 is preferably provided, to compensate for the reduced counter weight load needed as the boom arm 42 moves away from a horizontal position. The force applied by the spring 58 is minimal when the boom arm is horizontal. The force exerted by the spring 58 increases as the arm moves away from horizontal, with the spring force always acting to return the boom arm to horizontal.

The pivot joints, i.e., the crane pan pivot joint 140, frame pivot joint 160, boom arm pivot joint 46, and hand grip joints 276, are tightened to provide the desired degree of drag, which may vary for different applications, and according to the camera operator's personal preferences. For example, for prolonged filming with the camera lens fixed in a specific position, the joints may be tightened, to prevent any inadvertent movement of the lens 277, caused, for example, by air movement, vibrations, etc. On the other hand, where frequent, constant, or rapid camera movements are required, the pivot joints may be set with minimal drag.

The camera frame 68 can be moved in or out to different positions along the track section 60. If the camera lens 277 is perfectly horizontal (level) with the camera frame 68 at the mid-point of the track section 60, the lens 277 will experience a slight decline in angle as the camera frame 68 is moved out to the front end 61 of the track section. This occurs because the track section 60 tips down slightly under the added moment resulting from the pay load at the front end 61 of the track section 60. The downward deflection is caused primarily by compression of the wheels or tires 24 on the dolly 20, under the added load. Similarly, if the camera frame 68 is moved all the way back, adjacent to the track section arm 62, the relative reduction in load will cause the track section 60 to rise slightly, from back to front, so that the lens angle is now above horizontal. Again, this results primarily from the elasticity material characteristics of the wheels. The boom arm 42 itself, including the track section 60 have relatively high bending moments of inertia, relative to the pay loads carried. Consequently, although they of course deflect slightly with changes in pay load position, their contribution to the change in camera angle as the camera frame 68 moves in and out, is minimal.

Figure 3B:
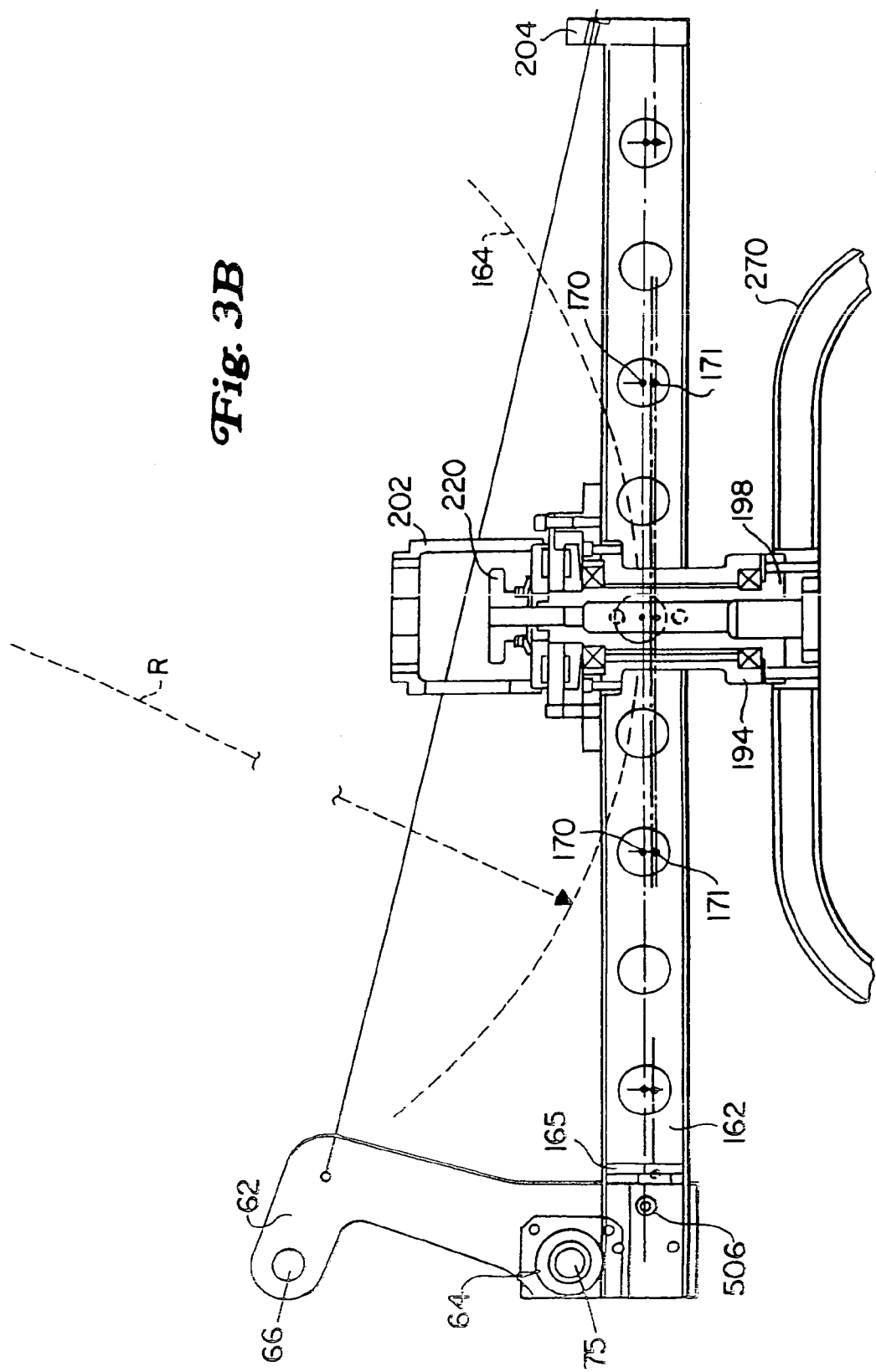
FIG. 3B is an enlarged view of the track section shown in FIG. 3A.

Referring to FIG. 3B, to compensate for the unwanted change in camera angle as the camera frame 68 moves along the track section 60, the track bearing rails 164 are preferably provided with a slight convex curvature. This convex curvature is preferably provided by deflecting the track bearing rails 164 to the desired curvature (with e.g., a press), and then tightening the rail bolts 170, shown in FIG. 5B, to clamp and hold the track bearing rails 164 into the desired curvature. As shown in FIG. 3B, this is achieved by having a second set of interior through holes 171 in the inside wall of the track tubes 162, with the holes 171 located on a very large radius R to hold the track bearing tubes 164 into the convex curvature. The curvature of the rails 164 in FIG. 3B, shown in dotted lines, is greatly exaggerated, for purposes of illustration.

With the track bearing rails 164 curved into the radius as described above, the camera 275 is leveled with the camera frame 68 at the center of the track section 60. Then, when the camera frame 68 is moved out to the front end 61 of the track section 60, the frame slider plate is located on a slightly inclined section of the radius, which ordinarily would cause the camera elevation angle to rise. However, the added moment or load resulting from the camera frame 68 at the end of the track section 60 causes the dolly wheels to deflect and compress, which along with the slight additional amount of strain in the metal of the boom arm 44 results in the camera elevation angle remaining substantially unchanged. Similarly, when the camera crane 68 is moved back adjacent to the track section arm 62, the reduced load on the dolly wheels and boom arm 40 would ordinarily cause an increase in camera angle elevation. However, as the frame slider plate 70 is now on a "downhill" section of the radius of the track bearing rails 164, the camera elevation angle remains substantially unchanged. As a result, the camera frame 68 may be moved to any position along the track section 60, without significantly changing the camera elevation angle.

The radius is preferably large, as only a slight amount of deflection occurs with movement of the camera frame 68 along the track section 60. Preferably, the radius ranges from 400–1200 inches, more preferably, about 600–1000 inches, and more preferably from 750–850 inches. In the specific embodiment shown in the figures, radius is 812 inches. The desired value of the radius R will of course vary with the deflection characteristics of the wheels or tires 24 and of the boom arm 42. The radius R may be matched to the dolly and crane 40 by setting them up for actual use; placing a load on the camera frame to simulate the weight of the a camera; and leveling the boom arm with the rails initially straight. The rails are then set at an estimated radius, e.g., 800 inches. A level indicating device, such as a laser is attached to the camera platform, and the frame 68 is moved to the front and to the back of its range of travel, while observing the level indicator. If the level rises at the back and declines at the front, then more curvature is needed. The fasteners 170 are loosened, the rails 164 are pressed into a tighter curve to reduce R, the fasteners retightened, and the level testing is again observed. This process may be repeated until the change in level of the camera platform from the front of the rails to the back, is reduced to an acceptable amount.

Referring to FIGS. 1–3, the boom arm 44 can pivot about the boom arm center pivot point 46 by about plus or minus 60 degrees. Many known crane or boom arms have undesirable pinch or shear points between their moving parts. As a result, a crane operators hands or arms, or other pieces of equipment such as cables, can be caught in the pinch points. However, the boom arm 44 avoids such pinch points, via the geometry of the leveling rods 48 and their attachment points. Specifically, as shown in dotted line in FIG. 3, with the arm 44 in the maximum up position, the upper end of the front wall 104 of the counter weight platform 52 comes close to the top surface of the rear segment 80, at location P. However, sufficient clearance remains so that an operator's hand cannot become trapped between the moving parts. Similarly, at the front end of the boom arm 44, at location Q in FIG. 3, clearance space remains between the leveling rods 48 and the track section arm 62, to prevent trapping an operators hand, cables, or other objects. Potential pinch points are reduced via the offset design of the leveling rods 48. As shown in FIG. 3A, the leveling rods are offset to the sides of the boom arm 44, reducing pinch points. In addition, as shown in FIG. 3A, the leveling rods 48 extend beyond the height of the boom arm 44 by only a slight amount, generally equal to one half of the height or diameter of the leveling rods 48. This reduces the space taken up by the crane 40, providing a more compact design which is advantageous for use in tight spaces, and for shipping. Crane movement due to wind is also reduces by the reduction in cross section achieved by the location of the leveling rods 48.

The non-tensionable or adjustable pivot joints, such as the leveling rod rear pivot joint 56 and front pivot joints 66 and the boom arm front pivot 64 are preferably provided with Teflon washers and needle bearings, for smooth, quiet and low friction pivoting movement. Stop pads 300 made of open cell urethane foam, or sorbathane foam are provided at the hard stop points of the boom arm 42, and at the front and the back ends of the track section 60. The pads 300 prevent a metal to metal stop at the limit of pivoting or linear travel. The open cell polyurethane foam, or sorbathane foam is preferred, because it compresses to dampen and absorb movement, but exerts very little kick back or press back force. Consequently, even at the limits of travel, there is no slip/stick movement and little or no backlash, i.e., inadvertent movement in an opposite direction. Vertical boom travel stops are similarly provided by a pad 500 on the post assembly 42.

Referring to FIGS. 1–3, with the crane 40 mounted on the camera dolly 20, the dolly 20 can be maneuvered in any direction to position the camera 275 as desired. In addition, the arm 26 of the camera dolly 20 may be raised to change the elevation of the camera 275. The crane 40 itself also provides for a wide range of movements. These movements include panning movements left and right 360+ about the crane pan pivot joint 140; tilt up or down, +/– about 60 degrees from horizontal, about the boom arm center pivot joint 46; linear travel in and out +/−12 inches, along the track section 60; pan left or right 360 degrees +, about the frame pivot joint 160; and tilt up or down in elevation 360+, about the hand grip joints 276.

Turning to FIG. 8, an alternative camera frame embodiment 280 provides all of the movements described above, as well as a roll left or right +/−60 degrees. The other components of the crane 40 are as described above. However, instead of the camera frame 68 having a U-section 270 suspended on the track axle 198, and outer roll housing 284 is attached to the track axle 198. The semicircular roll tube 286 extends from a left roll tube end bearing 288 at the left hand grip 274, through curved linear bearings 292 within the outer roll housing 284, and to a right side roll tube end bearing 288 at the right hand grip 274. A roll tube extension bar 285 is attached to the roll tube 286. Extension bar riser plates 284 are attached to the hand grip joints 276 and to the extension plate 285.

As shown in FIG. 9, a side plate 290 is connected to the hand grip joints 276 and to the base plate 272, and is dimensioned to place the center of gravity of the camera 275 on line H—H.

The roll embodiment 280 shown in FIG. 8 operates in the same way as the embodiment of FIGS. 1–3, except that the camera platform 272 can also roll left or right. Preferably, the center of gravity of the camera 275 is also positioned on the center line J of the frame pivot joint 160, so that the torque required to roll the camera remains constant throughout the roll movement. A drag adjuster 180 may also be provided on the outer roll housing 284, to adjust the drag of the roll movement. The center of gravity of the camera 275 and plate 272 are preferably set so that the radius RR from the center of gravity to the roll tube 286 does not change with roll movement. Consequently, the torque needed for roll movement remains constant regardless of the position of the camera and platform.

In most applications, the camera frame 68 or 280 will be suspended below the track section 60 on the track axle 198. However, for added lens height, the camera frame 68 or 280 may be unbolted from the bottom of the track axle, turned upside down, and then bolted on to a riser hub 202, as shown in FIGS. 3B and 8, so that the entire camera frame 68 or 280 is now above the track section 60. The camera 275 may remain attached to the top surface 281 of the base plate 272, so that the camera becomes upside down. The camera may then be righted by rotating the handles 274 to pivot the camera platform 272. The camera 275 is then positioned right side up, above the track section 60.

Referring to FIG. 2, the arms 271 and 273 of the U-section 270 are subject to low amplitude vibrations in the side to side, or left/right direction. To provide a more stable support for the camera 275, a vibration isolator 400, as shown in FIGS. 10 and 11, may be used with the U-section 270. The vibration isolator 400 includes a camera mounting plate 402 within a frame 404. The camera mounting plate 402 is moveable only in the side to side (left/right) direction. The camera mounting plate 402 is supported within the frame 404 via linear bearings 405 formed by ball bearings 418 within a semi-circular frame groove 414 in the frame 404, and a semi-circular plate groove 412 in the opposite edges of the plate 402. Ball springs 416 at the ends of the braces keep the ball bearings 418 centered. Return springs 408 are held within spring bores 410 in the lateral sides of the frame 404 and plate 402. Open cell polyurethane foam 106 is provided in the lateral spaces between the plate 402 and frame 404. Mounting holes 420 are provided in the plate 402, for mounting a camera onto a plate 402. As shown in FIG. 11, the camera mounting plate 402 is spaced slightly (e.g., 0.06 inches) the top surface 281 of the base plate 272. This provides clearance underneath the plate 402, for camera mounting hardware, and also suspends the plate 402 above the surface 281, so that it is free to move in the lateral direction L. The vibration isolator 400 has a low profile, with dimension T in FIG. 11 about 0.44 inches.

In use, the frame 404 is attached to the base plate 272. The camera 275 is attached to the camera mounting plate 402 via the mounting holes 420. The front edge F of the isolator 400 is oriented parallel to line H—H (in FIG. 3A).

Consequently, the plate 402 can move laterally, in the direction L, to dampen vibration of the arms 271 and 273 of the U-section 270. When a shock impulse or vibration occurs on the U-section 270, the base plate 272 and frame 404 of the vibration isolator 400 will move with the vibration or impulse. However, the camera 275 and mounting plate 402 are largely isolated from the frame 404 by the suspension of the plate 402 within the frame. Consequently, the camera 275 and plate 402 remain substantially still, via inertia, as the frame 404 moves under shock impulses or vibration. Specifically, if, under an impulse or vibration, the frame 404 moves to the right side, the mounting plate 402 remains substantially in the same position. The foam 406 on the left side compresses dampening the movement. The linear bearings 405 minimize friction between the frame 404 and the mounting plate 402, so that the plate 402 can move freely left and right within the frame 404, compressing the foam 406, as necessary, to silently dampen shock and vibration. The foam 406, when compressed, provides little return force. Accordingly, the return springs 408 are provided to return the frame 404 and mounting plate 402 to relatively centered positions, after the shock impulse or vibration has passed.

As shown in FIGS. 3B and 12–14, in an alternative design, a track section 500 may be removable from the track section arms 62. Specifically, in the removable design, track tubes 502 are used, similar to the track tubes 162, but with the back ends of the track tubes 502 having slots 504. Preferably, a single clamping bolt 506 extends through each of the track section arms 62 (as shown in FIG. 3B). The clamping bolts 506 pass into the slots 504 in the track tubes as the track tubes 502 are installed into the track section arms. The track tubes 502 are fully installed when the end of the slot 504 bottoms out against the clamping bolt 506. The clamping bolts 506 are then tightened, securely attaching the track section 500 onto the track section arms, and hence to the boom arm 44.

The track section 500 may be removed by loosening the clamping bolts 506 and pulling the track sections out of the track section arms.

With the track section 500 removed, the crane 40 is significantly shorter. This allows the crane to be more easily handled and shipped. The track section 500 may optionally be crated and shipped apart from the rest of the crane. As a result, the maximum dimension of the crane 40, for shipping purposes, is greatly reduced. The shipping weight may then also be divided between the track section (optionally including the camera frame 68) and the rest of the crane 40.

The track section may be more permanently attached to the boom arm 44 in the design shown in FIGS. 1–6, using the track section 60, or it may be removable, using the track section 500 shown in FIG. 13. With the track section removable, other accessories may be attached to the boom arm 44 in place of either track section 60 or 500. For example, a short camera platform or plate 530, as shown in FIG. 17, may be attached to the boom arm 44, via square tube stubs 532 inserted into the square openings 174 in the track section arms 62. Similar accessories, such as risers, drop down fixtures, swing heads, etc. may alternatively be attached and removed from the boom arm 44, in the same way that the track section 500 is attached and removed. For some applications, the versatile movements provided by the track section 60 or 500 are not needed. For these applications, the track section can be temporarily replaced with one of the smaller and lighter accessories described above, providing a more compact and lightweight crane. Due to the 2:1 ratio of the front and rear sections of the boom arm, every kilogram removed from payload (which here includes the track section or other accessory, as well as the camera and camera frame), reduces the counterweight load by two kilograms. Consequently, every one kilogram reduction in payload reduces the total crane weight by 3 kilograms. Hence, in some applications, replacing the track section 60 or 500, along with the camera frame 68 or 280 supported on the track section, can significantly reduce the total weight of the crane.

Referring still to FIGS. 12–14, a mounting block 520 is advantageously provided to allow the track section 500 (along with the camera frame 68 supported on the track section 500) to be attached to other types of camera cranes or dollies. The mounting block 520 has tube openings 522 adapted to receive the slotted back ends of the track tubes 502, similar to the openings in the track section arms 62. The mounting block 520 also has clamping bolts 526 for securely attaching the track tubes 502 to the mounting block 520, in the same way that the track tubes 502 are attached to the track section arms, as described above. With the track tubes attached to the mounting block 520, back ends of the track tubes are held in alignment.

The mounting block 520 is therefore preferably attached to the track tubes 502, during shipping, to hold the track tubes 502 in place. The mounting block can also be used to attach the track section to other types of cranes or dollies. A mounting hole 524 in the mounting block 520 allows a mounting bolt to extend through the mounting block, to attach the mounting block 520 and the track section 500 onto a platform or surface of another crane, such as the cranes described in U.S. Pat. Nos. 5,318,313; 5,312,121; or 5,781,814, incorporated herein by reference.

Figure 15:
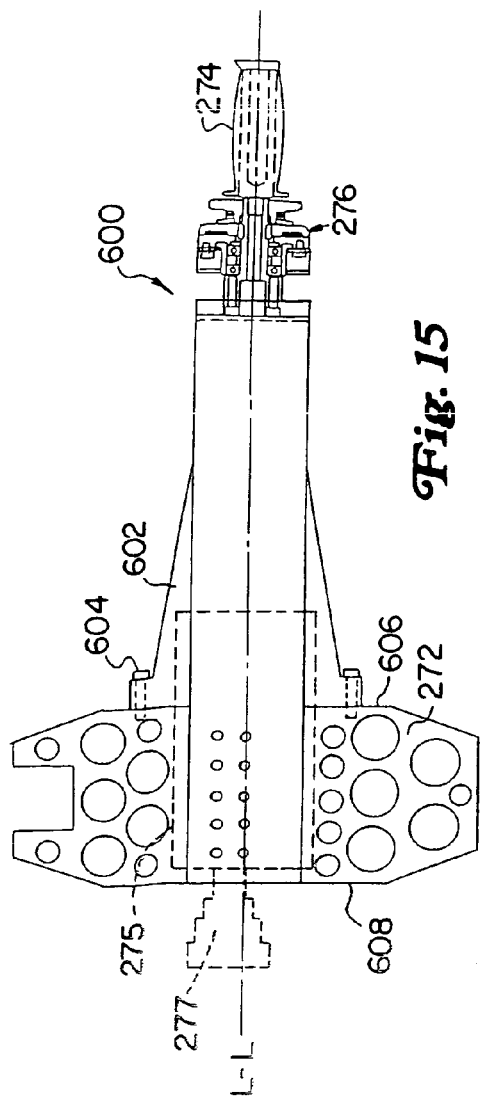
FIG. 15 is a top view of an accessory for providing roll movement.
Figure 16:
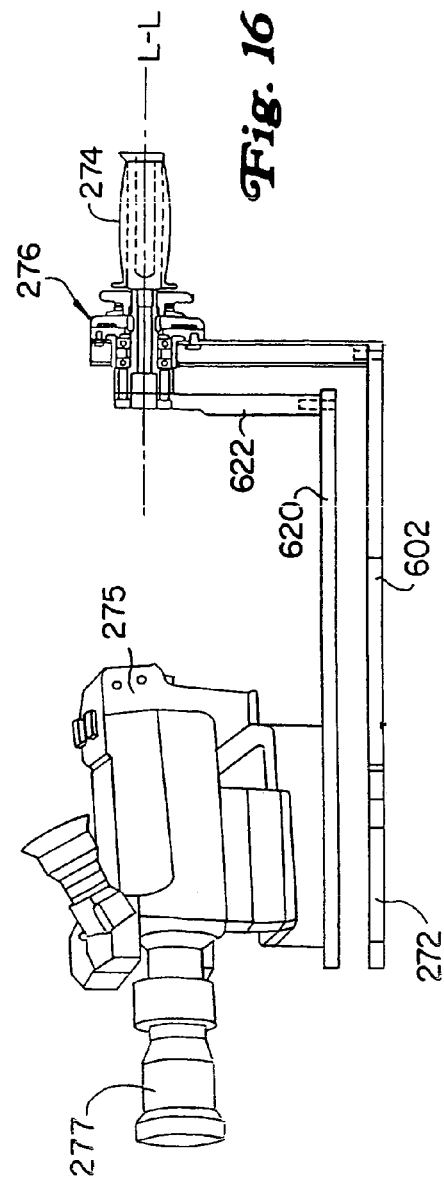
FIG. 16 is a side view of the accessory shown in FIG. 15.

Turning now to FIGS. 15 and 16, an accessory 600 for providing roll movement is attachable to the back surface 606 (or the front surface 608) of the base plate 272. The roll movement accessory 600 has a base plate bracket 602 preferably joined to the back surface 606 of the base plate 272 via bolts 604. An end plate extends vertically upwardly from the base plate bracket 602 and supports a hand grip joint or motion control device 276 having the construction and operation as described above. A hand grip 274 extends back from the hand grip joint 276. A roll end plate 622 is attached to the hand grip joint 276. A roll platform 620 extends forward (or away) from the handgrip joint 276. The camera 275 is mounted on the roll platform.

As described above with reference to FIGS. 1–6, the base plate 272 can be moved in many ways. However, it cannot roll. FIG. 8 shows an embodiment which can add a limited roll movement. The accessory 600 shown in FIGS. 15 and 16, when attached to the base plate shown in FIGS. 1–6, also provides roll movement. However, it is more compact, simpler, and more versatile than the roll embodiment in FIG. 8.

In use, the roll accessory 600 is bolted onto the base plate 272, and may be installed only when roll camera movement is needed. The camera 275 is then attached to the roll platform 620. The hand grip 274 is preferably behind the camera 275 and roll platform 620, as shown in FIG. 16. The hand grip 274 and hand grip joint or motion control device 276 are then operated as described above with reference to FIGS. 1–6. The roll platform 620 carrying the camera 275 is rolled to the desired angle. The hand grip joint 276 is tightened down to the desired amount of drag. The center of gravity of the camera 275, the roll platform 620, and the roll end plate 622 is preferably set up so that the entire payload is balanced about the roll axis L—L in FIG. 16. If balanced, then even with zero drag force applied by the hand grip joint 276, the camera will remain in whatever roll position it is placed into. Minor imbalances may also not be noticeable due to residual drag or friction in the joints. The camera lens 277 may also preferably be positioned co-linear with the roll axis L—L, so that the recorded image appears to revolve a stationary center point as the roll angle of the camera changes with pivoting or rotating movement of the roll platform 620.

With smaller cameras, the accessory 600 can provide a continuous 360°+roll movement. With larger cameras, the roll movement may be limited due to the camera or film magazine contacting the arms 271 or 273 of the U-frame section 270. However, in most filming situations, roll movements beyond 15–30° from vertical are not needed.

In certain filming or video applications, it is advantageous to change the ratio of the boom arm 44. This ratio is determined by the ratio of the distance between the boom arm front pivot joint 64 to the boom arm center pivot joint 46, to the distance between the boom arm center pivot joint 46 and the boom arm rear pivot joint 54. In the boom arm embodiment shown in FIG. 3A, this ratio is 2:1. FIGS. 18 and 19 show an alternative boom arm 700, which is extended to provide added reach to the camera crane. The boom arm 700 shown in FIGS. 18 and 19 is the same as the boom arm 44 shown in FIG. 3A, except as follows.

The second front segment 84 of the boom arm 44 is severed, separating the first front segment 82 from the rest of the second front segment 84, with an extension section 702 installed between the sections 82 and 84, as shown in FIG. 18. The extension section 702 has the same exterior shape and dimensions as the second front segment 84. Corner pins 704 extend from the corners of the extension section 702 into corner bores 706 in the section 84. Similarly, corner pins 704 extend from the modified first front segment 82 into corner bores 706 in the extension section 702.

An arm connecting plate 708 is secured within the front segment 82 via arm plate bolts 710. The back end of the arm connecting plate 708 extends outwardly from the segment 82 into the extension section 702. A pair of extension section locking bolts 724 extend from the top through the bottom of the extension section 702. A slot in the front end of the arm connecting plate 708 is positioned around the extension locking bolts 724. The arm connecting plate 708 extends vertically from the bottom inside surface 709 to the top inside surface 711 of the section 82, preferably, with a line to line fit. The section 82 is attached and secured to the extension section 702 by aligning the corner pins 704 with the corner bores 706, and then sliding the two sections together. Correspondingly, the slot in the front end of the arm connecting plate 708 moves into the extension section 702, around the extension locking bolts 724. The extension locking bolts 724 are then tightened, clamping the arm connecting plate 708 and the section 82 to the extension section 702. As the arm connecting plate 708 fits closely within the interior lower and upper surfaces 709 and 711 of the extension section 702, slight compression of the extension section 702 by the extension locking bolts 724 securely clamps the extension section 702 and the front segment 82 together.

The extension section 702 is similarly attached to the modified second front segment 84. Specifically, an extension connecting plate 720 is secured within the extension section 702 by bolts 722. The extension connecting plate 720 preferably fits substantially line-to-line with the lower and upper interior walls 709 and 711, of both the extension section 702 and the modified second front segment 84. The back end of the extension connecting plate 720 extends rearwardly out of the extension sections 702 and into the segment 84. Arm locking bolts 714 extend from the top to the bottom of the segment 84. A slot in the front end of the extension connecting plate 720 fits around the arm locking bolts 714.

The extension section 702 is attached to the segment 84 by aligning the corner pins 704 on the extension section 702, with the corner bores 706 in the segment 84, and sliding the extension section 702 against the segment 84. Correspondingly, the front end of the extension connecting plate 720 slides into the segment 84 and around the arm locking bolts 714. As the bolts 714 are tightened, the front end of the segment 84 compresses sufficiently to securely lock the extension section 702 to the segment 84. In practice, the extension section 702 is preferably attached first to the segment 84, and then the front segment 82 is attached to the extension section 702, for ease of assembly.

The extension section 702 is an accessory which may or may not be used. When used, it is installed to extend the length of the arm, as described above. The extension section 702 may be stored and shipped separately from the arm 700, to reduce storage and shipping container size. When the extension section 702 is not installed or used, the end segment 82 is connected directly to the second front segment 84. In particular, the corner pins 704 in the end segment 82 are aligned with the corner bores 706 in the segment 84, and the two segments are brought together. As this occurs, the front end of the arm connecting plate 708 moves into the interior of the segment 84. The slot and the arm connecting plate 708 moves around the arm locking bolts 714. The arm locking bolts 714 are tightened, to secure the segment 82 onto the segment 84, to provide a boom arm substantially the same as the arm 44 shown in FIG. 3A (but adapted to be extendable via use of the extension section 702). The extension section 702 can be of any desired length. Typically, the extension section 702 is between 0.5–4', more preferably 1 or 2' long.

As use of the extension section 702 lengthens, the boom arm 700, in comparison to the boom arm 44, the leveling rods 48 must be lengthened by a corresponding amount. As shown in FIGS. 20 and 21, an extended leveling rod 730 includes an extension rod 732 having an extension connection collar 734. The collar 734 is preferably permanently attached to the extension rod 732, via a pin 736, welding, etc. The leveling rods 48 shown in FIG. 3A are converted to be adaptable for use with an extended arm by severing the front end of the leveling rod 48 just behind the front pivot joint 66. A rod end collar 744 is preferably permanently installed to the rod end 742 having the pivot joint 66. The rod end collar 744 is dimensioned to slide into the extension rod 732. Similarly, the extension connection collar 734 is dimensioned to slide into the rear segment of the leveling rod 48. A first quick release locking pin 740 extends through a locking pin hole 738 in the extension rod 732 and the rod end collar 744. This allows the rod end 742 to be quickly connected and disconnected from the extension rod 732. Similarly, a second quick release locking pin 740 extends through a locking pin hole 738 in the rear segment of the leveling rod 48 and the extension connection collar 734. This allows the extension rod 732 to be quickly and easily attached and removed from the leveling rod 48.

In use, a pair of extension rods 732 matching the lengths of the extension section 702 to be used are provided as a kit. The extension rods 732 are installed to provide extended leveling rods 730 matching the increased length of the arm 700 provided by the extension section 702. The extension rods 732 are installed by inserting the extension connection collar 734 into the back segment of the leveling rod 48 and securing them together with the locking pin 740. The rod end 742 is then similarly attached into the front end of each extension rod 732.

When the extension rods 732 are not used, the rod end 742 is connected directly into the back segment of the leveling rod 48 by inserting the rod end collar 744 into the leveling rod 48. The rod end 742 is secure in place with a locking pin 740.

The track section 60 shown in FIGS. 1–3B may advantageously be used in certain applications separate from the boom arm 40. For example, the movement features provided by the track section 60 may be advantageously used by attaching the track section 60 directly to the dolly platform 28 (without using the other components of the crane 40). In this way, the track section 60 may be provided as an accessory for use directly on a camera dolly, such as the dolly 20 shown in FIG. 1, or with other camera dollies or cranes. Referring to FIGS. 22–24, a track section accessory 800 includes the track section 60 shown in FIGS. 1–3B. The slider plate assembly 70 is not used. Rather, a slide head 820 is provided on the track section 60. The accessory 800 is attached to a camera dolly platform, or other support, via a track frame 802.

Referring momentarily to FIGS. 25–27, the track frame 802, used to attach the track section 60 to a dolly or crane platform, includes a pair of track tube clamp assemblies 808 attached to a base plate 804. A large mounting stud 806 extends down from the base plate 804, to secure the base plate 804 and the track frame 802 to E.G., a camera platform such as platform 28 shown in FIG. 1. The square track tubes 162 of the track section 60 fit within the track tube clamp assemblies 808. Each clamp assembly 808 includes a clamp plate 814 pivotally attached to a clamping screw 812. The clamping plate 814 clamps the track tube 162 within the clamp assembly 808 by turning a hand wheel 810. Clamp plate screws or pins 816 help to maintain the clamp plate 814 in alignment. The clamp plate screws 816 may be spring loaded.

Figure 29:
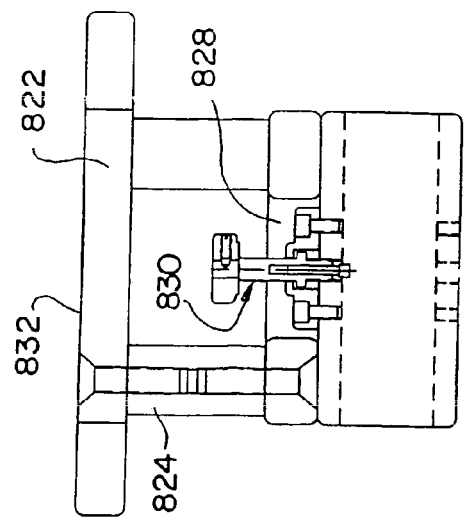
FIG. 29 is a side view thereof.
Figure 30:
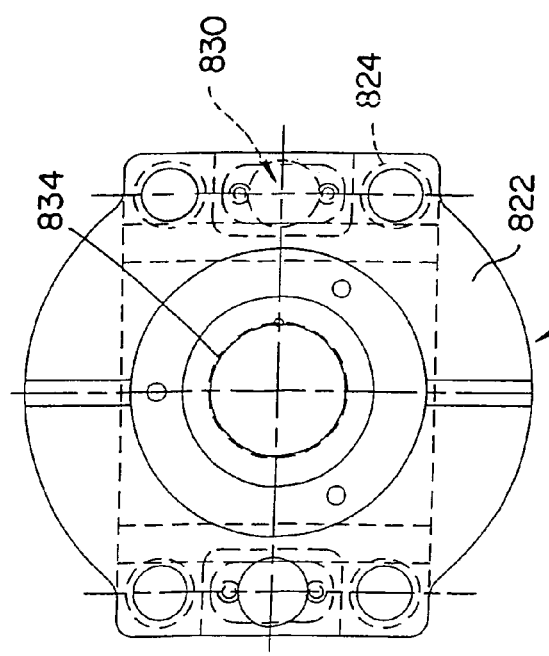
FIG. 30 is a top view thereof.
Figure 28:
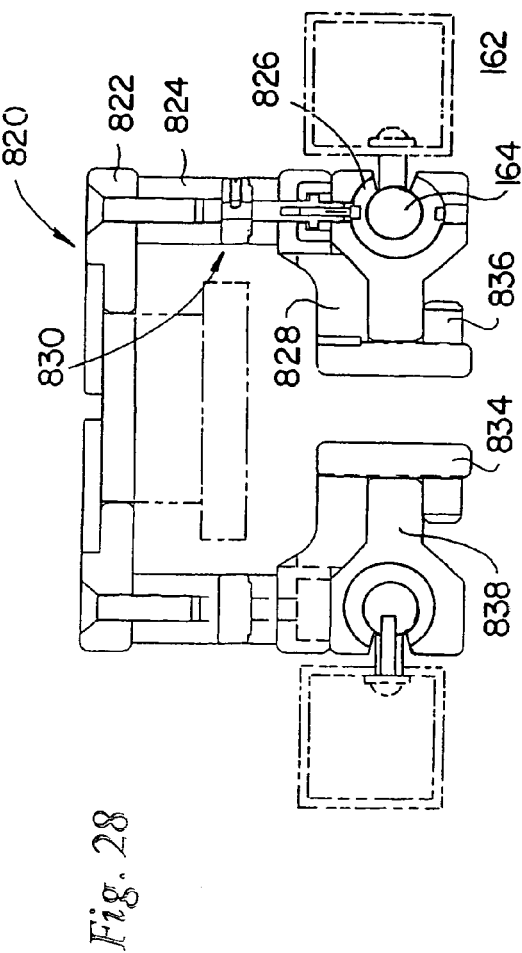
FIG. 28 is an end view, in part section, of the slide head shown in FIGS. 22–24.

Turning to FIGS. 28–30, the slide head 820 includes a camera mounting for Mitchell plate 822 attached to a head plate 828 via posts 824. The head plate 828 is slidably attached to the track bearing rails 164 via slide bearings 826. One or more slide brakes 830 on the head plate 828 are used to adjust the sliding friction of the slide head 820 on the track tubes 164.

A plate mounting stud 834 on the head plate 828 is secured to a tube plate 838 via a nut 836.

Referring once again to FIGS. 22–24, the track section accessory 800 is installed onto a platform 28 or other support using a nut on the stud 806. A camera, such as the camera 275, is mounted onto the plate 822, via the well-known Mitchell mount design, or other techniques. The slide head 820 carrying the camera can then slide along the track section 60, as described above. The slide head 820 can pass through the track frame 802, as shown in FIG. 22. Consequently, the track section 60 may be centered on the track frame 802, or it may be offset to one side. For example, as shown in FIGS. 23 and 24, the track frame 802 is at the extreme left end of the track section 60. This provides a maximum amount of travel distance from the platform 28 or other structure supporting the accessory 800. The slide head 820 may alternatively be inverted on the track section 60, as shown in dotted line in FIG. 23, to support the camera underneath the track section 60.

Consequently, via the use of the track frame 802 and slide head 820, the track section 60 provided on the crane 40 as shown in FIGS. 1–3B may also achieve several advantages provided by the crane 40, but in a more compact form, which is easier to store, transport, and use in more confined spaces.

Figures 31, 32:
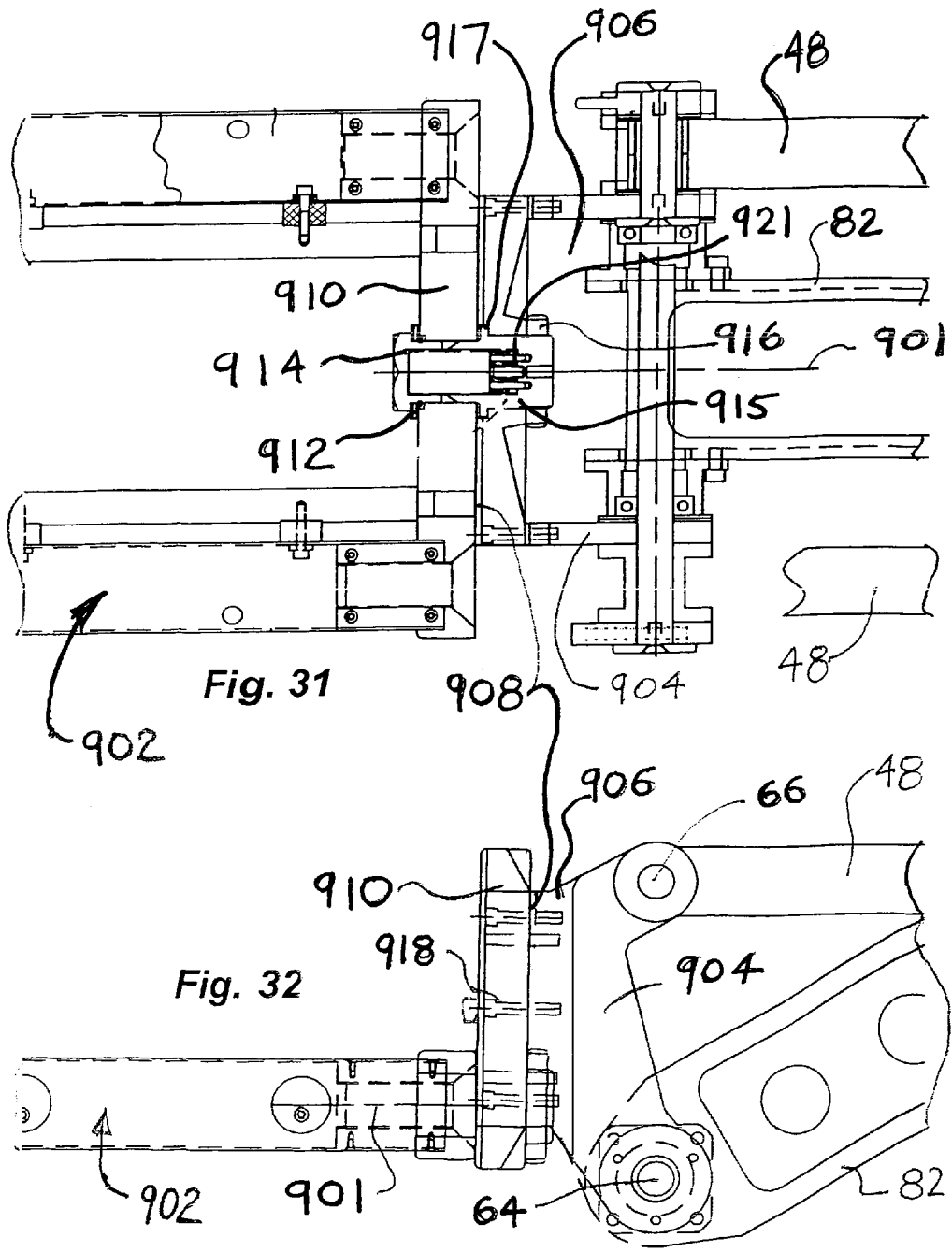
FIG. 31 is a plan view of an alternative embodiment with the track section pivotably attached to the boom arm.
FIG. 32 is a side view thereof.
Figure 33:
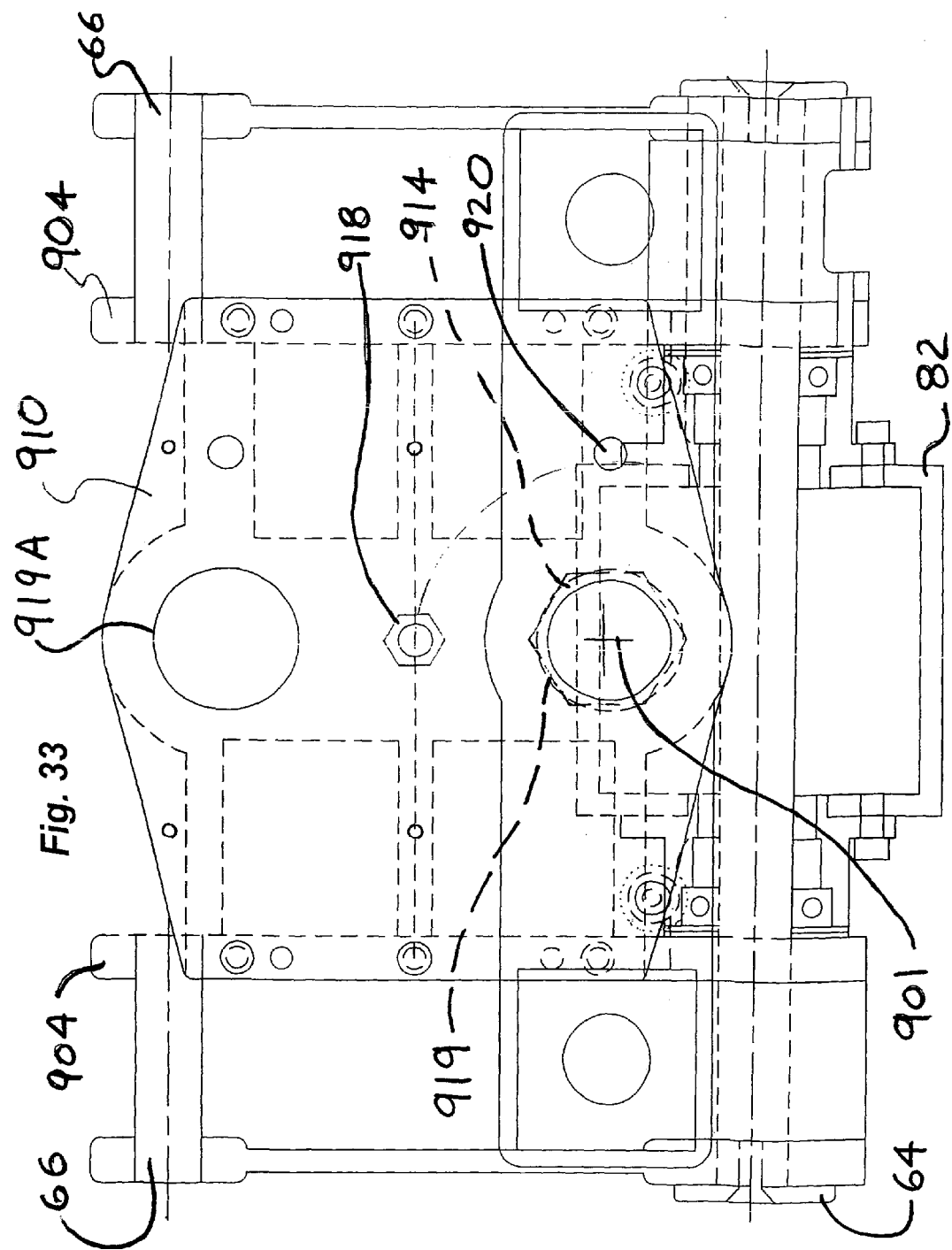
FIG. 33 is an end view thereof.

Turning now to FIGS. 31–33, in an alternate embodiment 900, a track section 902 is pivotable or rotatable about a roll axis 901. A pair of arm assemblies 904 are attached to the front end of the boom arm, similar or the same as the arm assemblies 62 in the design shown in FIGS. 1–3B. However, an arm plate 906 is joined to the arm assemblies. A track section plate 910 is attached to the back end of the track section 902. A low friction plate or disk 908 made of e.g., Teflon (Fluorine resins) is positioned between the plates 910 and 906. A pivot tube or stud 915 extends through the plates 910, 908, and 906. A flange 917 on the tube 915 positions the tube within a hole 919 in the plate 910. A nut 916 secures the tube 915 in place. A pivot bolt 914 extends through a needle bearing thrust washer 912, and is secured into the tube 915 via screw threads. The bolt 914 is tightened to a determined amount, to hold the track section 902 onto the end of the boom arm, while allowing the track section 902 to pivot about the axis 901 on the bolt 914. The low friction plate 908 and the washer 912 provide for a low friction attachment of the track section 902 onto the arm plate 906 and the boom arm. The track section 902 can be moved to a second higher position on the plate 910 by removing the nut 916, withdrawing the tube 915 and track section 902, reinstalling them in the second or upper hole 919A, and then securing them in place with the nut 916. This allows the elevation of the track section (and the camera) to be changed for different applications.

Referring to FIG. 33, a quick release pin 918 extends through holes in the track section plate 910 and the low friction plate 908 and into the arm plate 906, to lock the track section into the zero degree or vertical and upright position. In certain camera set up or filming actions, it is advantageous to pivot the entire track section 902 (which holds the frame 68 and the camera 275, about the axis 901. To achieve this movement, the pin 918 is pulled out. This releases the track section 902 for pivoting movement. The crane or camera operator can then move the track into a non-vertical position or zero degree position, as desired. The quick release pin is then replaced or allowed to spring back into engagement into the arm plate 906. This again locks the track section 902 against further movement about the axis 901. While FIG. 33 shows pin receiving holes 920 at the zero and 90 degree positions, holes 920 can be located in various positions, and several more holes may also be included to provide additional angular locking positions for the track section 902. A spring loaded pin and washer assembly 921 provides tension or friction on the bolt 914, to prevent the bolt 914 from inadvertently turning with pivoting movement of the track section 902. Except as described here with reference to FIGS. 31–33, the track section 902, arm assembly 904, and boom arm 44 may be the same as the components described above with reference to FIGS. 1–7.

Figure 34:
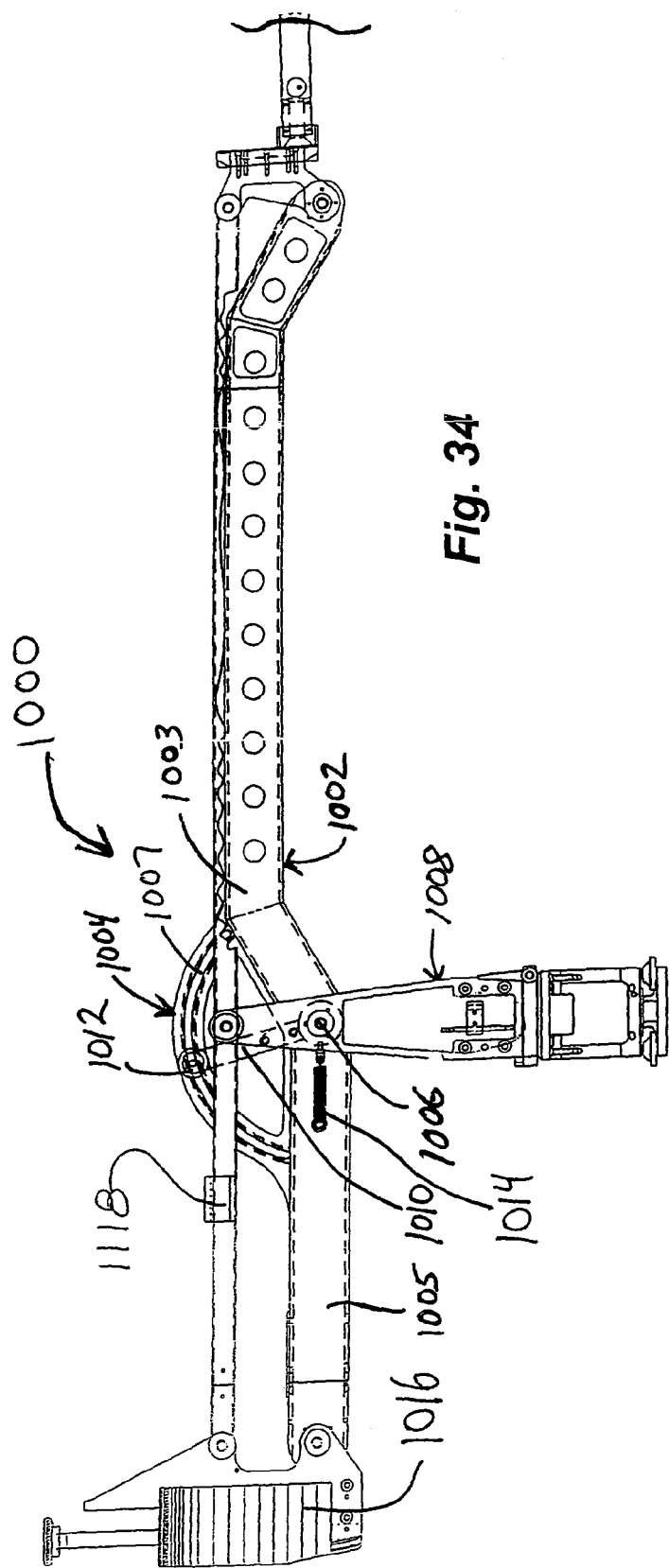
FIG. 34 is a side view of an alternative embodiment including a support member attached to the front and rear ends of the crane arm.

Turning now to FIG. 34, in an alternate embodiment 1000, the crane arm 1002 is provided with an arc or support member 1004 positioned over the pivot joint 1006 on the post assembly 1008. The arc member 1004, is preferably part of an integral weldment formed with both the front section 1003 and the rear section 1005 of the crane arm 1002 on either side of the pivot joint 1006. The arc member 1004 provides added strength and drift control to the crane arm 1002, allowing the crane arm 1002 to be longer and/or to carry greater payloads with less deflection.

The undercutting described for the crane arm embodiments shown in FIGS. 1–33 is preferably not performed on the crane arm 1002, since the additional aluminum or other material provides added strength for the longer crane arm 1002.

A lower end of a braking member 1010 is rigidly attached to post assembly 1008 at the pivot joint 1006. A pair of Teflon® (fluorine resins) washers 1012, or other low friction element is attached to an upper end of the braking member 1010 on either side of the arc member 1004. The washers 1012 can be tightened against the arc member 1004, via a wing nut threaded onto a bolt that passes through the two washers 1012 and an opening 1007 in the arc member 1004. The braking member 1010 is adjusted by increasing or decreasing the clamping force on the washers 1012, to adjust the drag forces acting on the crane arm 1002. As the elevation angle of the arm changes, the washers 1012 on the braking member 1010 slide along the outer surfaces of the arc member 1004.

One or more springs 1014 are preferably attached to one or both sides of the rear section 1005 of the crane arm 1002 and to the post assembly 1008. The springs 1014 help to keep the crane arm 1002 in balance, regardless of the position of the crane arm 1002, as described in U.S. Pat. No. 6,345,919, incorporated herein by reference. Hand weights 1118 are advantageously slidably attached to the leveling rods. These weights, typically from 4–25 pounds, can be used to make fine balancing adjustments.

As extension sections are added to the front section 1003 of the crane arm 1002, the rear section 1005 of the crane arm 1002 is typically also extended to help keep the crane arm 1002 in balance. Accordingly, the number of counterweights 1016 required to balance the crane arm 1002 is reduced. Additionally, the overall weight of the crane arm 1002 is not increased significantly. In general, for every two feet of extensions added to the front section 1003 of the crane arm 1002, one foot of extensions are added to the rear section 1005 of the crane arm 1002 to aid in balancing the crane arm 1002. For every foot of extension added to the front section 1003 of the crane arm 1002, the overall weight of the crane arm 1002 is preferably increased by approximately ten to fifteen pounds (i.e., 1.5 feet of extensions, one foot in the front and one half foot in the rear, preferably weigh approximately 10–15 pounds).

A novel camera crane has been shown and described. As the crane may be a single piece, it can be quickly set up, without tools. As it provides for many different movements, separate leveling heads or other accessories are not needed. In addition, the camera operator has complete control of all needed camera movements. The crane, which is lightweight due to hollow beam construction, undercutting (in most embodiments), and lightening holes, can therefore be operated by a single person. Various changes and modifications may of course be made without departing from the spirit and scope of the invention. The invention, therefore, should not be limited, except by the following claims, and their equivalents.

What is claimed is:

1. A camera crane comprising:
   a post assembly;
   a boom arm pivotably connected to the post assembly;
   a counter weight platform pivotably connected to a second end of the boom arm;
   a track section arm pivotably attached to a first end of the boom arm;
   a leveling rod pivotably attached to the counter weight platform and to the track section arm;
   a track section pivotably attached to the track section arm; and
   a camera frame linearly movable along the track section, with the camera frame including a base plate for supporting a camera.

2. The camera crane of claim 1 wherein the track section arm is pivotable on the boom arm about a first axis, and wherein the track section is pivotable relative to the track section arm about a second axis perpendicular to the first axis.

3. The camera crane of claim 1 further comprising an arm plate on the track section arm, a track section plate on the track section, and a low friction plate between the track section plate and the arm plate.

4. The camera crane of claim 3 further comprising a quick release pin extendable through the track section plate, the low friction plate and into the arm plate, for locking and releasing pivoting movement of the track section.

5. A camera crane comprising:
   a post assembly;
   a boom arm pivotably connected to the post assembly;
   balancing means for balancing the boom arm;
   a track section pivotably attached to the boom arm, to allow pivoting movement of the track section relative to the boom arm about a first axis, and about a second axis perpendicular to the first axis; and
   leveling means for maintaining the track section in a level position as the boom arm pivots relative to the post assembly.

6. The camera crane of claim 5 further including a camera frame linearly movable along the track section, with the camera frame including a base plate for supporting a camera.

7. A camera crane comprising:
   a boom arm;
   a front section attached to, and pivotable about a first axis and a second axis relative to, a first end of the boom arm;
   a counter weight platform at a second end of the boom arm; and
   one or more leveling rods linked to the counter weight platform and to the front section.

8. A camera crane comprising:
   a post assembly;
   a boom arm pivotably attached to the post assembly at a pivot joint;
   a front section attached to a first end of the boom arm;
   a rear section attached to a second end of the boom arm;
   a counter weight platform on the rear section;
   a support member attached to the front section and the rear section adjacent the pivot joint;
   wherein the support member comprises a rigid metal arc integrally joined with the front and rear sections.

9. The camera crane of claim 8 further comprising one or more leveling rods linked to the counter weight platform and to the front section.

10. The camera crane of claim 8 further comprising a braking member pivotably attached to the post assembly at the pivot joint and moveable along the support member.

11. The camera crane of claim 8 further comprising one or more hand weights slidable along the rear section.

12. A camera crane comprising:
   a post assembly;
   a boom arm pivotably attached to the post assembly at a pivot joint;
   a front section attached to a first end of the boom arm;
   a rear section attached to a second end of the boom arm;
   a counter weight platform on the rear section;
   a support member attached to the front section and the rear section adjacent the pivot joint; and
   at least one spring connected to the rear section and the post assembly for balancing the crane arm.

13. A camera crane comprising:
   a post assembly;
   a boom arm pivotably attached to the post assembly at a pivot joint;
   a front section attached to a first end of the boom arm;
   a rear section attached to a second end of the boom arm;
   a counter weight platform on the rear section;
   a support member attached to the front section and the rear section adjacent the pivot joint;
   wherein a longitudinal axis of the front section is vertically offset from a longitudinal axis of the rear section.

14. A camera crane comprising:
   a post assembly;
   a crane arm pivotably attached to the post assembly, with the crane arm including a front section extending from a first side of the post assembly, and a rear section extending from a second side of the post assembly;
   balancing means attached to the rear section of the crane arm;
   rigid support means attached to the front section and the rear section of the crane arm; and
   a braking member pivotably attached to the post assembly and moveable along the support means.

15. The camera crane of claim 14 further comprising at least one spring connected to the rear section of the crane arm and the post assembly for balancing the crane arm.

16. The camera crane of claim 14 wherein the braking member includes a securing means that is tightenable against the support member for compensating for drag forces acting on the crane arm.

* * * * *